United States Patent
Butcher

(10) Patent No.: US 11,018,780 B2
(45) Date of Patent: May 25, 2021

(54) AUTOMATED INSTALLED ENVIRONMENT ANTENNA CHARACTERISTICS DETERMINATION

(71) Applicant: Verizon Patent and Licensing Inc., Washington, DC (US)

(72) Inventor: Nicholas D. Butcher, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/829,367

(22) Filed: Mar. 25, 2020

(65) Prior Publication Data

US 2020/0295852 A1 Sep. 17, 2020

Related U.S. Application Data

(63) Continuation of application No. 16/351,646, filed on Mar. 13, 2019, now Pat. No. 10,637,591.

(51) Int. Cl.
| | |
|---|---|
| *H04L 1/02* | (2006.01) |
| *H04B 17/12* | (2015.01) |
| *H04B 17/13* | (2015.01) |
| *H04B 17/10* | (2015.01) |
| *H04B 17/21* | (2015.01) |
| *H04B 17/26* | (2015.01) |
| *H04B 17/14* | (2015.01) |

(52) U.S. Cl.
CPC .......... *H04B 17/12* (2015.01); *H04B 17/103* (2015.01); *H04B 17/13* (2015.01); *H04B 17/14* (2015.01); *H04B 17/21* (2015.01); *H04B 17/26* (2015.01)

(58) Field of Classification Search
CPC ...... H04B 17/12; H04B 17/103; H04B 17/13; H04B 17/14; H04B 17/21; H04B 17/26
USPC .................. 375/267, 299, 347; 455/99, 132
See application file for complete search history.

(56) References Cited

U.S. PATENT DOCUMENTS

| | | |
|---|---|---|
| 7,486,720 B2 | 2/2009 | Molisch et al. |
| 2006/0203894 A1* | 9/2006 | Ventola ............... H04B 1/7093 375/148 |
| 2006/0290568 A1* | 12/2006 | Sillasto ..................... G01S 5/10 342/464 |
| 2010/0246496 A1 | 9/2010 | Yurugi et al. |
| 2012/0220238 A1 | 8/2012 | Hosoya et al. |

* cited by examiner

*Primary Examiner* — Tesfaldet Bocure

(57) ABSTRACT

A network device receives first data associated with a first transmission received at a second antenna from a first antenna and stores the first data as a first antenna profile associated with the second antenna. The network device uses the stored first antenna profile for determining at least one first transmission characteristic associated with a third antenna transmitting to the second antenna.

20 Claims, 19 Drawing Sheets

AUTOMATED INSTALLED ENVIRONMENT ANTENNA CHARACTERISTICS DETERMINATION

RELATED APPLICATION

The present application is a continuation of, and claims priority to, U.S. application Ser. No. 16/351,646 entitled "Automated Installed Environment Antenna Characteristics Determination" filed Mar. 13, 2019, the contents of which are incorporated by reference herein in their entirety.

BACKGROUND

The installed environment of any device, having transmitter/receiver (Tx/Rx) functionality, modifies the effective transmit/receive characteristics of that device. For example, the installed environment may significantly modify the effective antenna gain of the antenna of the transmitter/receiver. Therefore, theoretical assumptions about characteristics of the antenna, such as the antenna's gain, which are made for the device in an unimpeded environment may no longer be valid in an environment in which the device is actually installed. As an example, a signal transmitted from an antenna having a theoretical antenna gain indicating a theoretical apparent received power of x dBM may, within a particular installed environment, actually be received with an apparent power of 2*x, or x/2. In applications that use measured apparent received power as a proxy for some other metric, such as, for example, a distance between transmitter and receiver, the deviation of the actual received power from theoretical values, due to changes in the transmitter's effective antenna gain, can introduce a significant error.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Exemplary embodiments described herein enable the characterization of transmissions between transmit antennas and receive antennas in an installed environment, including the automated determination of antenna characteristics of the transmit and receive antennas within the installed environment. During a training phase, that may involve multiple different roaming testing platforms mounted with receivers and their receive antennas, transmissions from transmit antennas are received at the receive antennas, and various parameters of the transmissions, the transmit antennas, and the receive antennas are obtained. The various parameters include, for example, a transmit power $P_T$, a transmit antenna location, a receive antenna location, a transmit antenna gain $G_T$, and a receive antenna orientation (e.g., antenna heading, elevation, and azimuth). The various parameters of the transmission, transmit antennas, and the receive antennas may be utilized to determine an effective directional antenna gain $G^{Eff}_R$ of the receive antennas at a particular antenna orientation within the installed environment. The determined effective directional antenna gain $G^{Eff}_R$ may be subsequently used for making more accurate estimates of transmit antenna location based on a measured receive apparent power $P_R$ of transmissions from the transmit location. The various parameters associated with each training transmission, and transmit and receive antenna characteristics, may be stored as an antenna profile within a database.

During subsequent operational phases, data associated with normal operational transmissions received at receive antennas from transmit antennas may be stored in an antenna measurement database, and subsequently used for analyzing and automatically updating the previously stored antenna profiles derived during the training phases. The antenna profiles, including updated effective directional antenna gains $G^{Eff}_R$, may be used, in conjunction with apparent receive power $P_R$ of transmissions measured at receive antennas, to conduct accurate estimations of the locations of the transmit antennas sending the transmissions.

Figure 1:
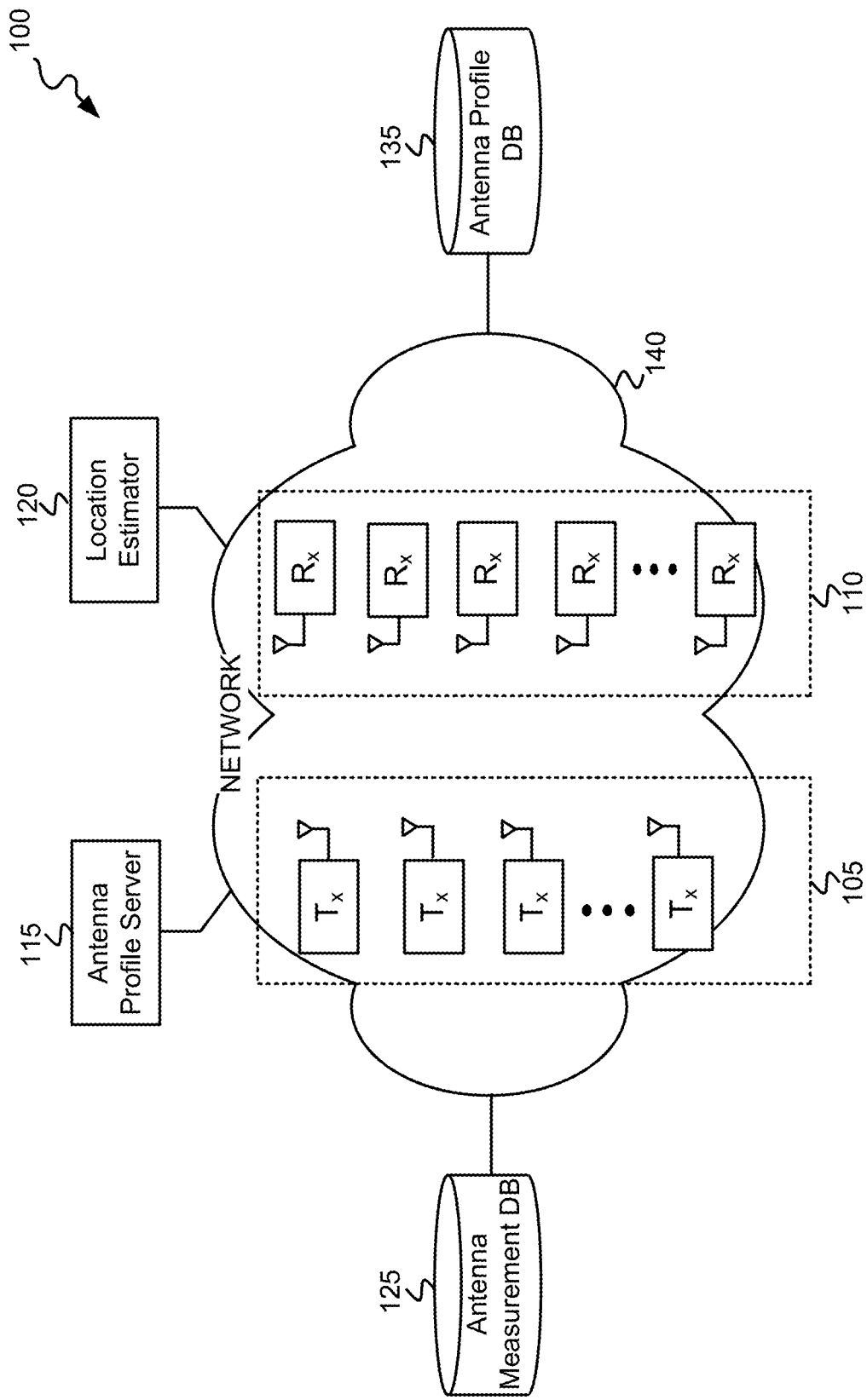
FIG. 1 depicts an exemplary network environment in which automated determination of effective antenna profile characteristics and antenna location determination is implemented.

FIG. 1 depicts an exemplary network environment 100 in which automated determination of effective antenna profile characteristics and antenna location determination is implemented. As shown, network environment 100 may include multiple transmitters ($T_x$) 105, multiple receivers ($R_x$) 110, an antenna profile server 115, a location estimator 120, an antenna measurement database (DB) 125, an antenna profile DB 135, and a network 140.

Transmitters ($T_x$) 105 and receivers ($R_x$) 110 may each include a device that includes a transmitter/receiver (Tx/Rx) module, and at least one corresponding antenna, for transmitting and receiving wireless transmissions. Therefore, transmitters Tx 105 shown in FIG. 1 may include both a transmitter and a receiver (not shown), and receivers Rx 110 may also include both a transmitter (not shown) and a receiver. Tx 105 and Rx 110 are shown as being components of network 140. However, some of Tx 105 and/or Rx 110 may be external to network 140, and may connect, either through wired or wireless connections, to network 140. For example, in some circumstances, network 140 may include a wireless Public Mobile Network (PLMN), and a Tx 105 or a Rx 110 may be a component of a wireless device (e.g., a cellular telephone) that communicates with the PLMN via wireless transmissions. In other circumstances when network 135 includes a wireless PLMN, a Tx 105 or a Rx 110 may be a component of a base station (e.g., eNodeB, gNodeB) that serves as an access point for wireless devices to the PLMN. Each of Tx 105 and Rx 110 may, therefore, be a component of a mobile system (e.g., a vehicle installation) or a fixed system (e.g., an antenna tower installation).

Antenna profile server 115 includes one or more network devices that connect with network 140 and which receive, process, and store antenna profile data received from receivers Rx 110 in antenna profile DB 135. Antenna profile server 115 automatically determines, and updates, an effective gain $G^{Eff}_R$ of each receive antenna in its installed environment, based on training and measurement data obtained during transmitter-to-receiver training transmissions and operational transmissions. Antenna profile server 115 stores relevant antenna characteristic data in antenna profile DB 135.

Location estimator 120 includes one or more network devices that connect with network 140 and which automatically utilize antenna profile data stored in antenna profile DB 135, and training measurements and ongoing operational measurements stored in antenna measurement DB 125, to accurately estimate transmitter Tx 105 locations. In one implementation, antenna profile server 115 and location estimator 120 may be implemented by the same one or more network devices. In this implementation, the operations described below with respect to antenna profile server 115 and the operations described below with respect to location estimator 120 are performed by the same one or more network devices.

Antenna profile DB 135 includes one or more network devices that further include memory devices that store a data structure that stores, among other parameters, characteristics of antennas in their installed environments including, for example, an antenna identifier, an identification of antenna type, an identification of the antenna's installed environment, an orientation of the receive antenna relative to the transmit antenna (e.g., based on the receive antenna's heading, elevation, and azimuth), and an effective antenna gain ($G^{Eff}_R$) of the antenna at the receive antenna orientation relative to the transmit antenna. Exemplary antenna characteristic data, and other parameters, stored in antenna profile DB 135 is described with respect to FIG. 9 below.

Antenna measurement DB 125 includes one or more network devices that further include memory devices that store a data structure that stores measurement data, and other parameters, associated with transmissions received at receive antennas in their installed environments during training measurement phases and/or operational measurement phases. Exemplary operational antenna characteristic data, and other parameters, stored in antenna measurement DB 125 is described with respect to FIG. 8 below.

Network 140 may include any type of network that includes wireless stations (e.g., base stations, eNBs, gNBs, wireless access points) that connect to external wireless devices (e.g., IoT devices, cellular smart phones). In some implementations, network 140 may include at least one PLMN or wireless satellite network. The PLMN(s) may include a Code Division Multiple Access (CDMA) 2000 PLMN, a Global System for Mobile Communications (GSM) PLMN, a Long-Term Evolution (LTE) PLMN (e.g., Fourth Generation (4G) or Fifth Generation (5G)) and/or other types of PLMN(s) not specifically described herein. In other implementations, network 140 may additionally, or alternatively, include a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, and/or a cable network (e.g., an optical cable network). Each PLMN may be operated and/or administered by a particular wireless network service provider (i.e., a "carrier" or a "mobile network operator" (MNO)).

The configuration of the components of network environment 100 depicted in FIG. 1 is for illustrative purposes only, and other configurations may be implemented. Therefore, network environment 100 may include additional, fewer, and/or different components, that may be configured or connected differently, than depicted in FIG. 1.

Figure 2:
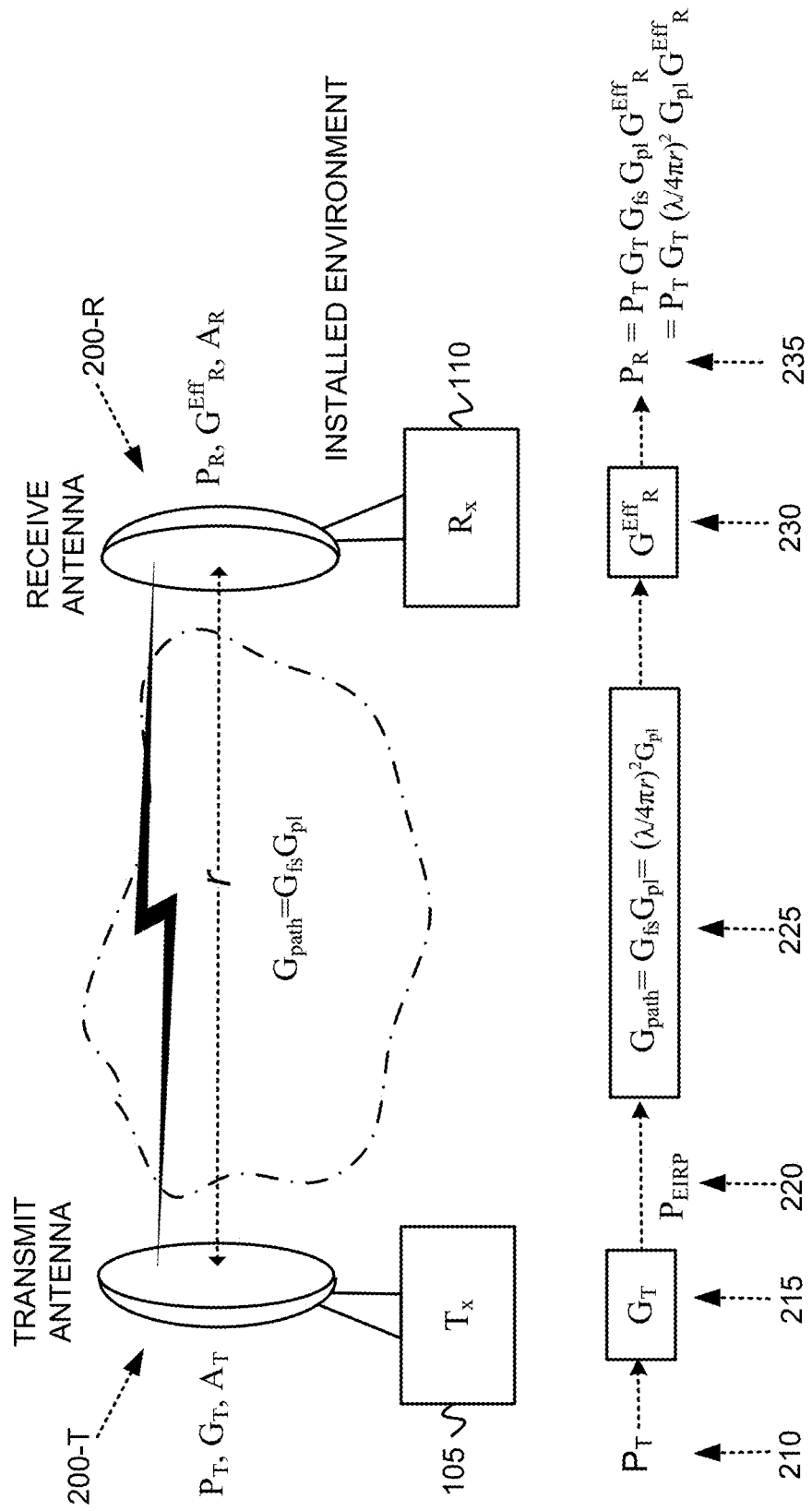
FIG. 2 depicts an example of wireless communication between a transmit antenna of a transmitter and a receive antenna of a receiver in an installed environment.

FIG. 2 depicts an example of wireless communication between a transmit antenna 200-T of a transmitter Tx 105 and a receive antenna 200-R of a receiver Rx 110 in an installed environment. Though not shown, the installed environment may include the structures or platforms upon which the Tx 105 and Rx 110 are installed, and/or the intervening topography (e.g., hills, valleys, mountains) and man-made structures (e.g., buildings, roadway structures) that reside within the transmission path between Tx 105 and Rx 110.

As shown, transmit antenna 200-T, having an effective area $A_T$ and a known antenna gain $G_T$, transmits a signal at a transmit power $P_T$ and wavelength $\lambda$ (i.e., proportional to a frequency f) to receive antenna 200-R over a distance r of free space. Receive antenna 200-R has an effective area $A_R$ and an effective antenna gain $G^{Eff}_R$ within the installed environment. A transmission model is shown at the bottom of FIG. 2, with the apparent receive power $P_R$ 235 received at receive antenna 200-R equaling the transmit power $P_T$ 210 multiplied by the transmit antenna gain $G_T$ 215, the path gain $G_{path}$ 225, and the receive antenna gain $G_R$ 230:

$$P_R = P_T G_T G_{Path} G^{Eff}_R \qquad (1)$$

With the path gain $G_{path}$ equaling the free space gain $G_{fs}$ multiplied by the path loss gain ($G_{p1}$), and $G_{fs}$ equaling $(\lambda/4\pi r)^2$, the receive power $P_R$ 235 equals:

$$P_R = P_T G_T (\lambda/4\pi r)^2 G_{p1} G^{Eff}_R \quad (2)$$

As described further below, equation (2) may be used to determine an effective gain $G^{Eff}_R$ of a receive antenna if the following are known: 1) geo-locations of the transmit antenna and the receive antenna, 2) the transmit power $P_T$ of the transmit antenna, 3) the transmit antenna gain $G_T$, 4) the transmission wavelength or frequency, and 5) the path loss gain $G_{P1}$.

Figure 3:
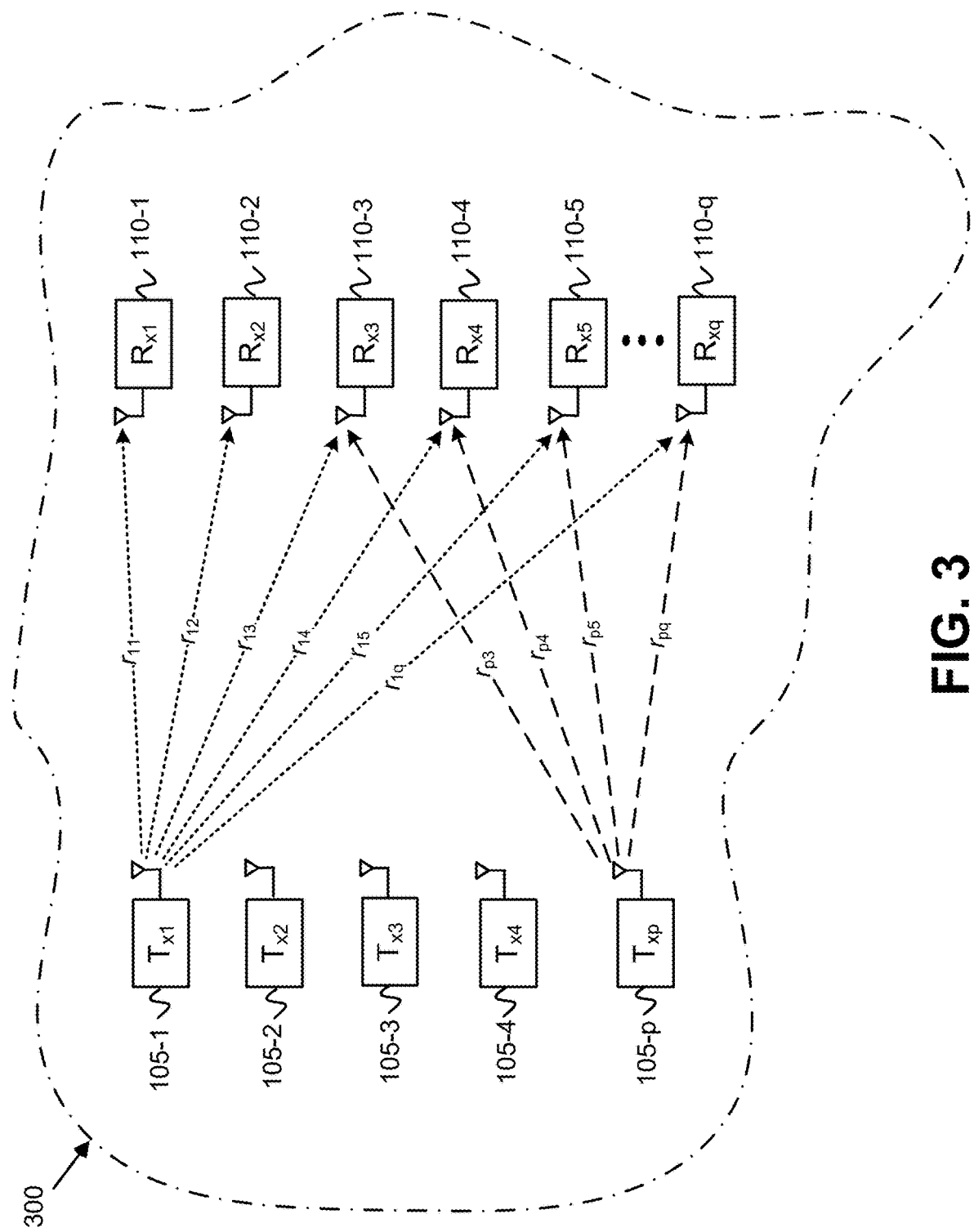
FIG. 3 depicts an exemplary installed environment in which multiple receivers receive transmissions from one or more of multiple transmitters.

FIG. 3 depicts an exemplary environment 300 in which multiple receivers $R_{x1}$ 110-1 through $R_{xq}$ 110-$q$ receive transmissions from one or more of multiple transmitters $T_{x1}$ 105-1 through $T_{xp}$ 105-$p$. In the example shown, transmitter $T_{x1}$ 105-1 transmits to $R_{x1}$ 110-1 over distance $r_{11}$, transmits to $R_{x2}$ 110-2 over distance $r_{12}$, transmits to $R_{x3}$ 110-3 over distance $r_{13}$, transmits to $R_{x4}$ 110-4 over distance $r_{14}$, transmits $R_{x5}$ 110-5 over distance $r_{15}$, and transmits to $R_{xq}$ over distance $r_{1q}$. Further, in the example shown, transmitter $T_{xp}$ 105-$p$ transmits to $R_{x3}$ 110-3 over distance $r_{p3}$, transmits to $R_{x4}$ 110-4 over distance $r_{p4}$, transmits to $R_{x5}$ 110-5 over distance $r_{p5}$, and transmits to $R_{xq}$ 110-$q$ over distance $r_{pq}$. In the environment 300, the antenna of receiver $R_{x1}$ 110-1 may exhibit an effective antenna gain $G_{R1}$, the antenna of receiver $R_{x2}$ 110-2 may exhibit an effective antenna gain $G_{R2}$, the antenna of receiver $R_{x3}$ 110-3 may exhibit an effective antenna gain $G_{R3}$, etc. Based on the known variables described above with respect to FIG. 2, and using Equation (2), the effective antenna gain $G^{Eff}_R$ of a receive antenna of each receiver $R_x$ may be determined based on one or more transmissions from transmitters $T_{x1}$ through $T_{xp}$.

Figure 4:
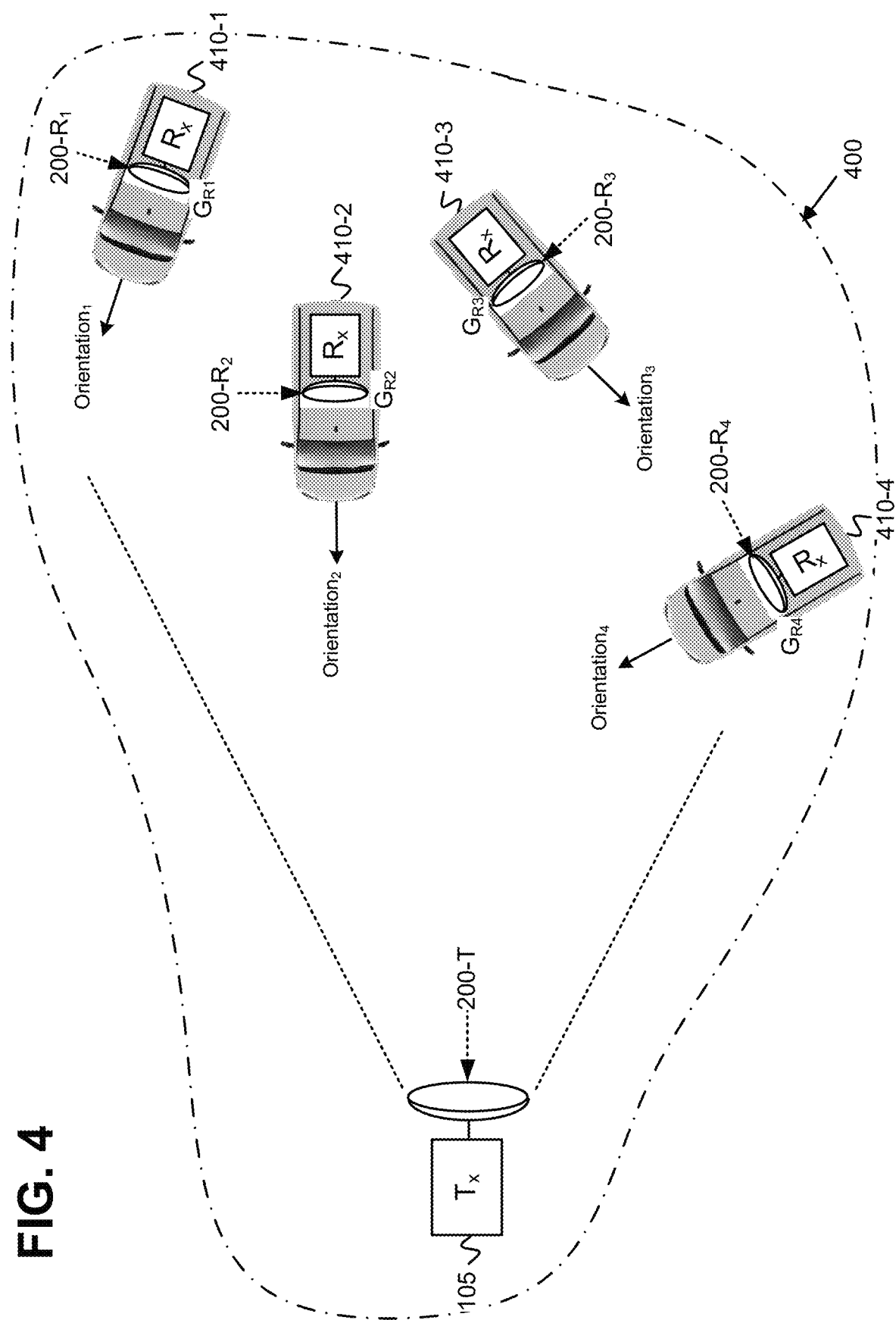
FIG. 4 depicts an example of the determination of an effective antenna gain $G_R$ of receive antennas associated with multiple different receivers where the installed environment includes the receivers, and associated antennas, mounted upon movable testing platforms.

FIG. 4 depicts an example of the determination of an effective directional antenna gain $G^{Eff}_R$ of receive antennas associated with multiple different receivers $R_x$ where an installed environment 400 includes the receivers $R_x$, and their associated antennas, mounted upon movable testing platforms, such as upon roaming vehicles (e.g., vans or trucks). As shown in the example, four movable testing platforms 410-1, 410-2, 410-3 and 410-4 roam within the installed environment 400. During a training phase, in which each different receiver Rx 110 determines the effective antenna gain $G^{Eff}_R$ of its respective receive antenna 200-R, a transmitter Tx 105 transmits a test/training transmission, at a frequency f, via a transmit antenna 200-T to the movable testing platforms 410-1, 410-2, 410-3, and 410-4. At the instant of the test transmission from Tx 105, testing platform 410-1 has an orientation$_1$ relative to Tx 105, testing platform 410-2 has an orientation$_2$ relative to Tx 105, testing platform 410-3 has an orientation$_3$ relative to Tx 105, and testing platform 410-4 has an orientation$_4$ relative to Tx 105. The orientation of each of testing platforms 410-1 through 410-4 includes a compass heading of each platform, an amount of pitch of each platform, and an amount of roll of each platform. Testing platform 410-1 includes a Rx 110 having a receive antenna 200-$R_1$, testing platform 410-2 includes a Rx 110 having a receive antenna 200-$R_2$, testing platform 410-3 includes a Rx 110 having a receive antenna 200-$R_3$, and testing platform 410-4 includes a Rx 110 having a receive antenna 200-$R_4$.

During the training phase, and based on the testing transmission(s) from Tx 105, Rx 110 at testing platform 410-1 determines the effective antenna gain $G_{R1}$ of receive antenna 200-$R_1$, Rx 110 at testing platform 410-2 determines the effective antenna gain $G_{R2}$ of receive antenna 200-$R_2$, Rx 110 at testing platform 410-3 determines the effective antenna gain $G_{R3}$ of receive antenna 200-$R_3$, and Rx 110 at testing platform 410-4 determines the effective antenna gain $G_{R4}$ of receive antenna 200-$R_4$. Each testing platform 400 determines the effective antenna gain $G_R$ of its respective receive antenna 200-R by solving equation (2) for $G^{Eff}_R$. The exemplary process of FIGS. 10A and 10B below describes further details of one exemplary implementation of the determination of effect directional antenna gain $G^{Eff}_R$ of a receive antenna.

Figure 5:
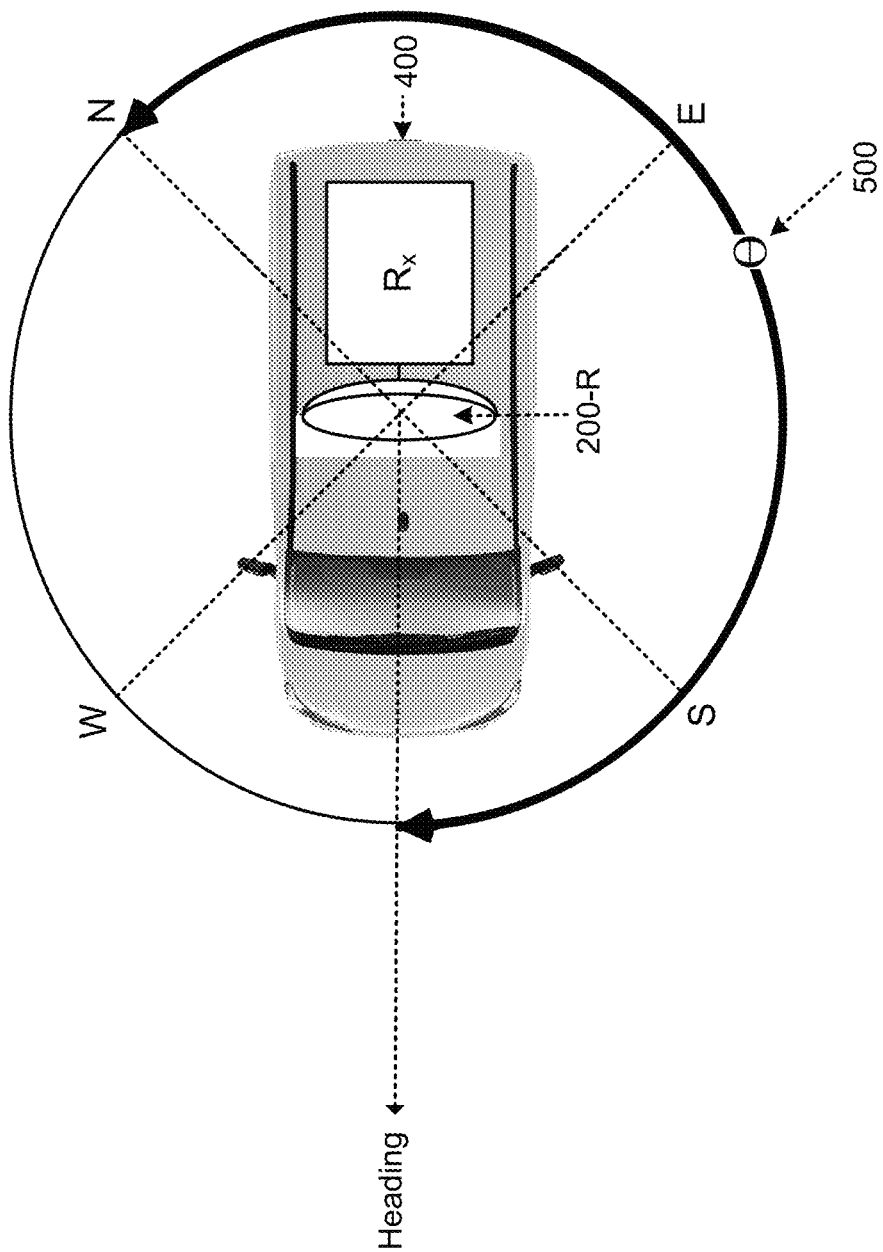
FIG. 5 shows a heading of a testing platform relative to geographic compass directions.
Figure 6:
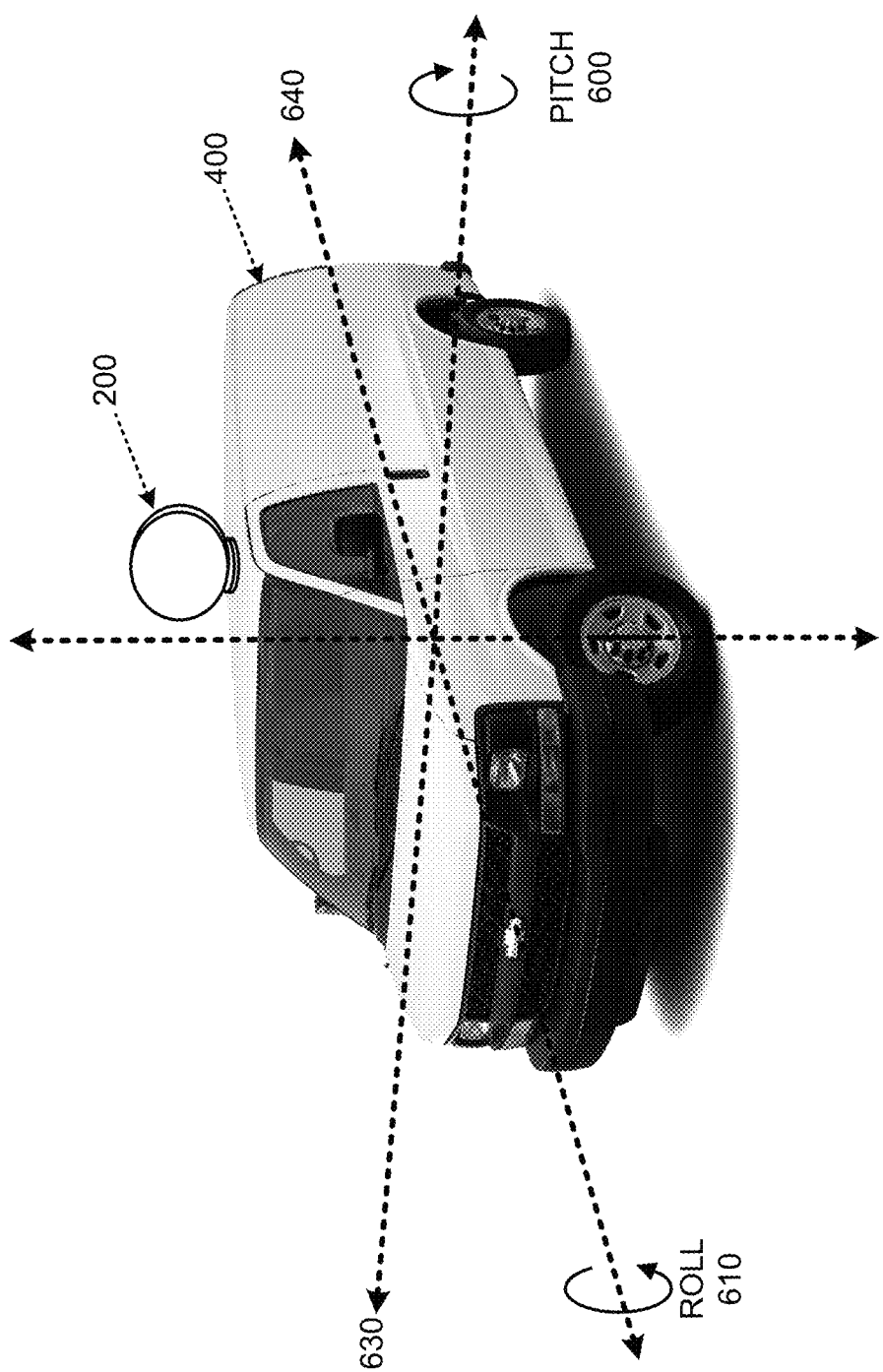
FIG. 6 depicts a pitch and a roll of a testing platform and its mounted antenna.

FIGS. 5 and 6 depict details of an orientation of each testing platform 410 that may be determined during a training phase, such as shown in FIG. 4. FIG. 5 shows a heading θ of testing platform 410 relative to geographic compass directions (e.g., relative to magnetic north (N)). Given that antenna 200-R may be mounted on testing platform 410 with a known antenna orientation relative to the heading θ of testing platform 410, measurement of the heading θ of testing platform 410 determines, in turn, the heading (i.e., compass direction) of antenna 200-R. FIG. 6 depicts a pitch 600 and a roll 610 of testing platform 410 and its mounted antenna 200-R. A pitch sensor (not shown), installed within testing platform 410, determines the pitch 600 of testing platform 410 relative to, for example, a transverse axis 630 that extends through the center of gravity of testing platform 410 and perpendicular to a front and rear of testing platform 410. A roll sensor (not shown), installed within testing platform 410, determines the roll 610 of testing platform 410 relative to, for example, a longitudinal axis 640 that extends through the center of gravity of testing platform 410 and parallel to the body of testing platform 410. Testing platform 410 may translate the measured pitch 600 and roll 610, given a known physical relationship between its mounted antenna 200-R and testing platform 410, to a particular azimuth and elevation of the mounted antenna 200-R. The measured orientation of the receive antenna 200-R, thus, includes the measured heading, azimuth, and elevation. In a circumstance where the location $loc_{Rx}$ of the receive antenna and a location $loc_{Tx}$ of a transmit antenna 200-T transmitting to the receive antenna 200-R are known, the orientation of the receive antenna 200-R relative to the transmit antenna 200-T may be determined based on the measured heading, azimuth, and elevation of the receive antenna 200-R, as described further below with respect to FIG. 10C.

Figure 7:
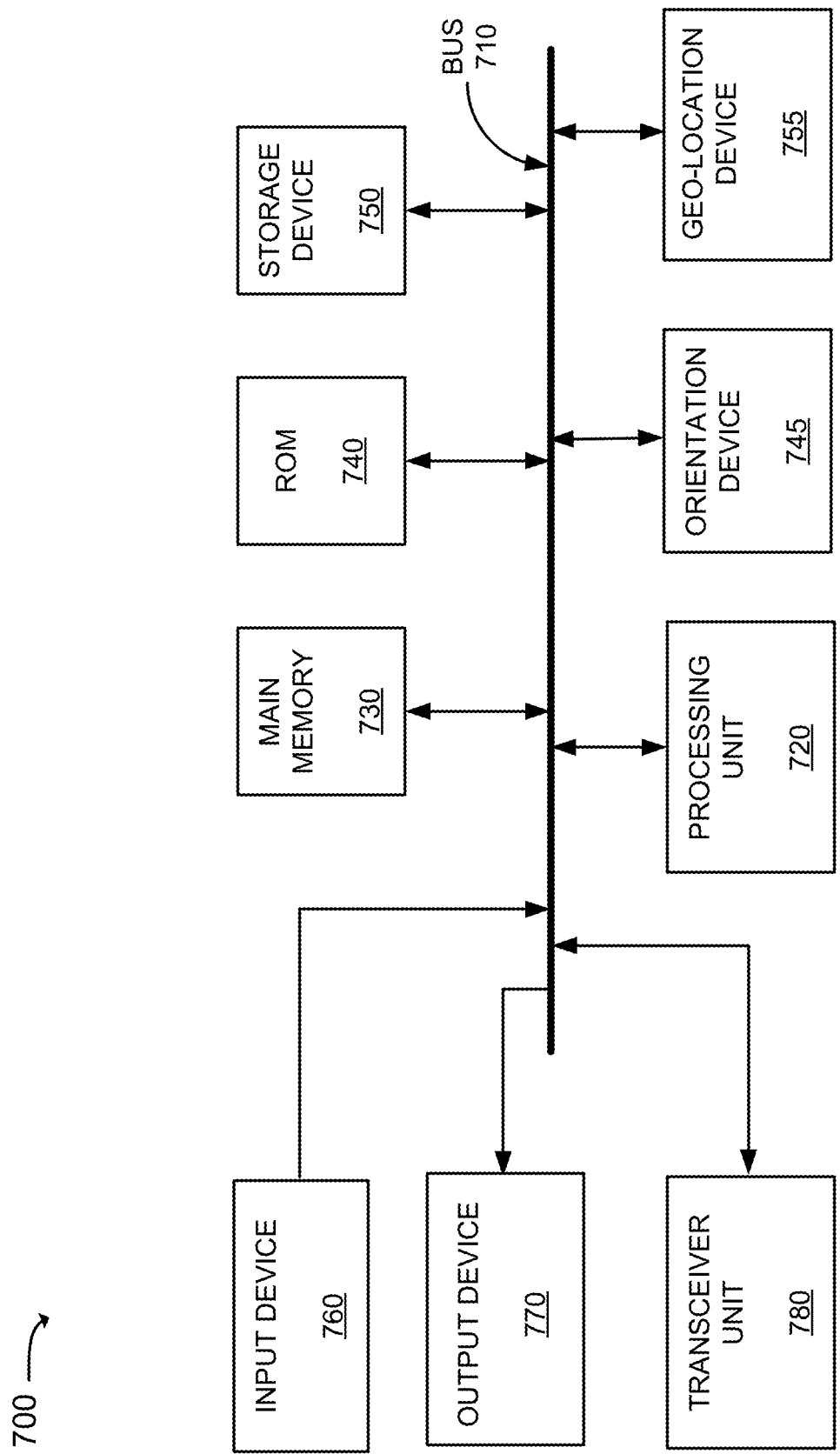
FIG. 7 depicts exemplary components of a device that may correspond to the transmitters, the receivers, the antenna profile server, the location estimator, the antenna profile database, and/or the antenna operational database of FIG. 1.

FIG. 7 depicts exemplary components of a device 700. Tx 105, Rx 110, antenna profile server 115, location estimator 120, antenna measurement DB 125, and/or antenna profile DB 135 may each include a device or devices similar to device 700, possibly with some variations in components and/or configuration. Device 700 may include a bus 710, a processing unit 720, a main memory 730, a read only memory (ROM) 740, an orientation device 745, a storage device 750, a geo-location device 755, an input device 760, an output device 770, and a transceiver unit 780.

Bus 710 includes a path that permits communication among the components of device 700. Processing unit 720 may include one or more processors or microprocessors, or processing logic, which may interpret and execute instructions. Main memory 730 may include a random access memory (RAM) or another type of dynamic storage device that may store information and instructions for execution by processing unit 720. ROM 740 may include a ROM device or another type of static storage device that stores static information and instructions for use by processing unit 720. Orientation device 745 may include a heading sensor (e.g., a compass), a pitch sensor, and/or a roll sensor. The heading sensor supplies an indication of a heading of device 700 to processing unit 720. The pitch sensor supplies an indication of pitch, associated with a structure or housing in which device 700 is installed, to processing unit 720. The roll sensor supplies an indication of roll, associated with a structure or housing in which device 700 is installed, to processing unit 720. In a case where device 700 is a component of a Tx 105 or Rx 110 mounted on a testing platform 400, then the pitch sensor supplies an indication of pitch associated with testing platform 400 and the roll sensor supplies an indication of roll associated with testing platform 400. Storage device 750 may include a magnetic and/or optical recording medium. Main memory 730, ROM 740 and storage device 750 may each be referred to herein as a "non-transitory computer-readable medium" or a "non-transitory storage medium."

Geo-location device 755 includes a geo-location determining device. In one implementation, geo-location device 755 may include a Global Positioning System (GPS) device that determines a geo-location of device 700 based on satellite signals. In other implementations, geo-location device 755 may alternatively, or additionally, include a magnetic compass device and/or an inertial navigation device that can determine a heading and/or current geo-location of device 700. In further implementations, device 700 may have a fixed geo-position (e.g., a permanent installation), and the geo-position may be ascertained by surveying techniques and the surveyed geo-position coordinates may be stored in main memory 730, ROM 740, or storage device 750 for retrieval and use by device 700. Input device 760 may include one or more devices that permit an operator to input information to device 300, such as, for example, a keypad or a keyboard, a display with a touch sensitive panel, voice recognition and/or biometric mechanisms, etc. Output device 770 may include one or more devices that output information to the operator or user, including a display (e.g., with a touch sensitive panel), a speaker, etc. Input device 760 and output device 770 may be implemented as a graphical user interface (GUI) (e.g., a touch screen GUI that uses any type of touch screen device) that displays GUI information and which receives user input via the GUI. Transceiver unit 780 includes at least one transceiver (a transmitter Tx and a receiver Rx), and at least one associated antenna, that enables device 700 to communicate with other devices and/or systems. For example, transceiver unit 780 may include a wireless transceiver for communicating with one or more other devices, or with components of network 135.

The configuration of components of device 700 shown in FIG. 7 is for illustrative purposes. Other configurations may be implemented. Therefore, device 700 may include additional, fewer and/or different components, arranged in a different configuration, than depicted in FIG. 7. For example, antenna profile server 115, location estimator 120, antenna profile DB 135, and antenna measurement DB 125 may include similar components to those shown in FIG. 7 but may omit orientation device 745 and/or geo-location device 755.

Figure 8:
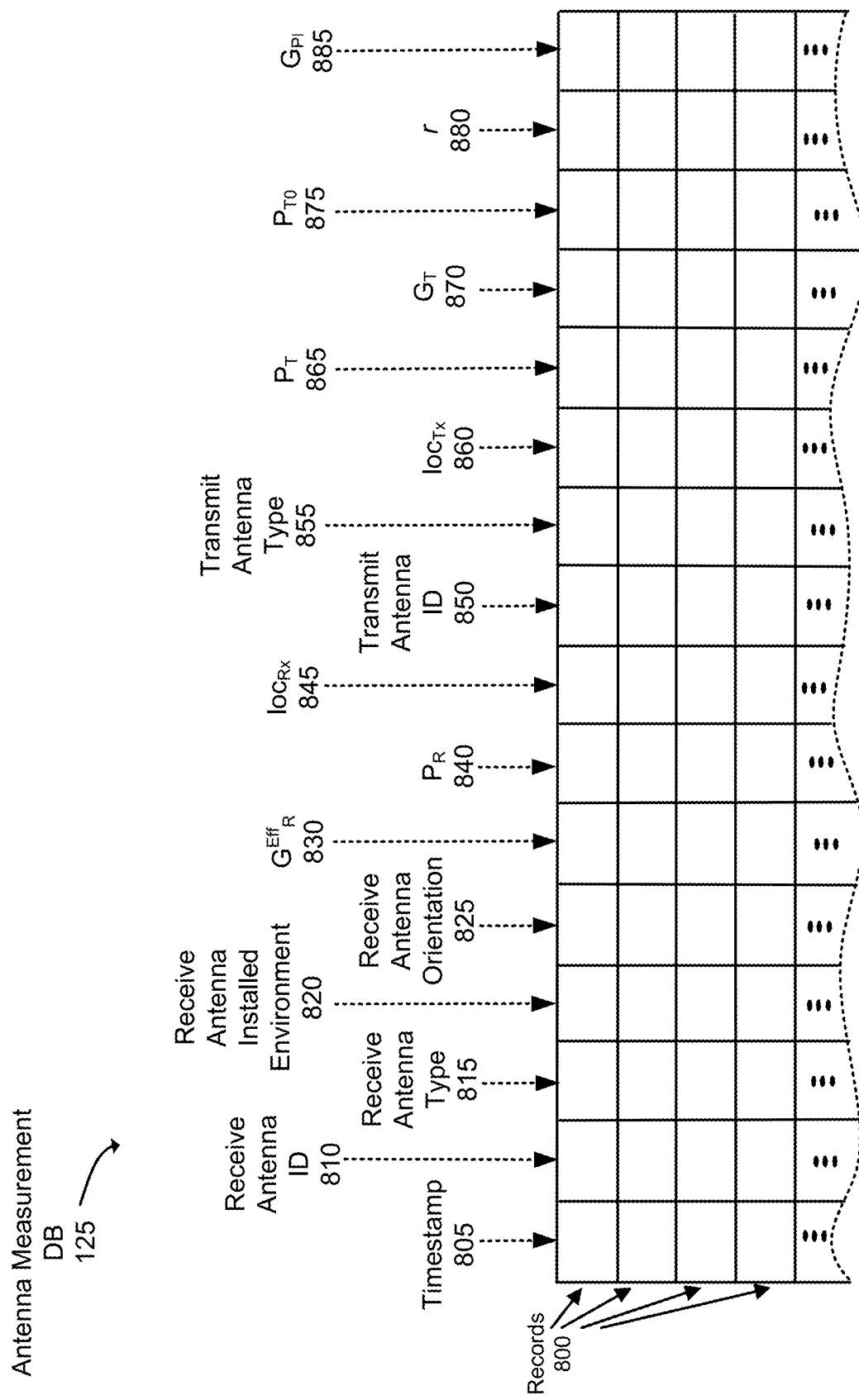
FIG. 8 depicts an exemplary implementation of a data structure that may be stored in the antenna measurement database of FIG. 1.

FIG. 8 depicts an exemplary implementation of a data structure that may be stored in antenna measurement DB 125. As shown, the stored data structure may include multiple records 800 associated with training and/or operational transmissions from transmit antennas 200-T of transmitters Tx 105 to receive antennas 200-R of receivers Rx 110. Each record 800 may be associated with a particular transmission from an identified transmit antenna 200-T to an identified receive antenna 200-R across space in an installed environment. Each record 800 may include a timestamp field 805, a receive antenna ID field 810, a receive antenna type field 815, a receive antenna installed environment field 820, a receive antenna orientation field 825, a receive antenna effective gain $G^{Eff}_R$ field 830, a receive power $P_R$ field 840, a receive antenna location ($loc_{Rx}$) field 845, a transmit antenna ID field 850, a transmit antenna type field 855, a transmit antenna location ($loc_{Tx}$) field 860, a transmit power $P_T$ field 865, a transmit antenna gain $G_T$ field 870, a reference transmit power ($P_{T0}$) field 875, a receive antenna to transmit antenna distance (r) field 880, and a path loss gain $G_{P1}$ field 885.

Timestamp field 805 stores a time (e.g., date, and time in Hours: Minutes: Seconds: Milliseconds format) at which a particular transmit antenna 105, identified in field 850, transmitted across space to the receive antenna identified in field 810.

Receive antenna ID field 810 stores a unique identifier (ID) associated with a particular receive antenna 200-R of a receiver Rx 110 that receives a transmission from a Tx 105. Receive antenna type field 815 stores data identifying a particular type of antenna of the antenna identified in field 810 of the record 800. Receive antenna installed environment field 820 stores data that identifies a particular environment at which the receive antenna, identified in field 810, is installed. The particular environment identified in field 820 may include, for example, an identifier associated with a vehicle (and possibly a location upon the vehicle) upon which the antenna is installed. Other types of installed environments may be identified in field 820.

Receive antenna orientation field 825 stores data indicating a heading, elevation, and/or azimuth of the antenna identified in field 810 at a time at which a particular transmission is received from the transmit antenna identified in field 850. In one implementation, the antenna orientation field 825 may store data indicating a normalized orientation $O_N$ of the receive antenna 200-R relative to the transmit antenna 200-T, as described further below with respect to FIG. 10C. Receive antenna effective gain $G^{Eff}_R$ field 830 stores an effective directional antenna gain $G^{Eff}_R$ of the receive antenna identified in field 810 at the receive antenna orientation specified in field 825.

Receive power $P_R$ field 840 stores data indicating an apparent receive power of the transmission received at the receive antenna, identified in field 810, from the transmit antenna identified in field 850. Receive antenna location ($loc_{Rx}$) field 845 stores data that identifies the geo-location of the receive antenna identified in field 810 at the time, identified in timestamp field 805, that the transmit antenna, identified in field 850, transmitted to the receive antenna.

Transmit antenna ID field 850 stores a unique identifier (ID) associated with a particular transmit antenna 200-T of a transmitter Tx 105 that transmitted the transmission to the receive antenna identified in field 810. Transmit antenna type field 855 stores data identifying a particular type of antenna of the antenna identified in field 850 of the record 800.

Transmit antenna location ($loc_{Tx}$) field 860 stores data that identifies the geo-location of the transmit antenna, identified in field 850, that transmitted to the receive antenna identified in field 810. Transmit power $P_T$ field 865 stores data indicating a transmit power of the transmission received at the antenna identified in field 810 from the transmit antenna identified in field 850. Transmit antenna gain $G_T$ field 870 stores a transmit antenna gain $G_T$ of the transmit antenna, identified in field 850, that transmitted to the receive antenna identified in field 810.

Reference transmit power ($P_{T0}$) field 875 stores data indicating a reference transmit power, at a known distance (e.g., 1 meter) from the transmit antenna identified in field 850, that may be used (i.e., in place of $P_T$ and $G_T$) for determining antenna characteristics. Receive antenna to transmit antenna distance (r) field 880 stores data that indicates a distance r between the location $loc_{Rx}$ identified in field 845 and the location $loc_{Tx}$ identified in field 860.

Path loss gain $G_{P1}$ field 885 stores data that indicates a gain factor associated with a path loss between the transmit antenna, identified in field 850, and the receive antenna, identified in field 810. The path between the transmit antenna and the receive antenna may include obstructions that may contribute to a path loss gain factor $G_{P1}$ that alters the free space gain $G_{fs}$.

Figure 9:
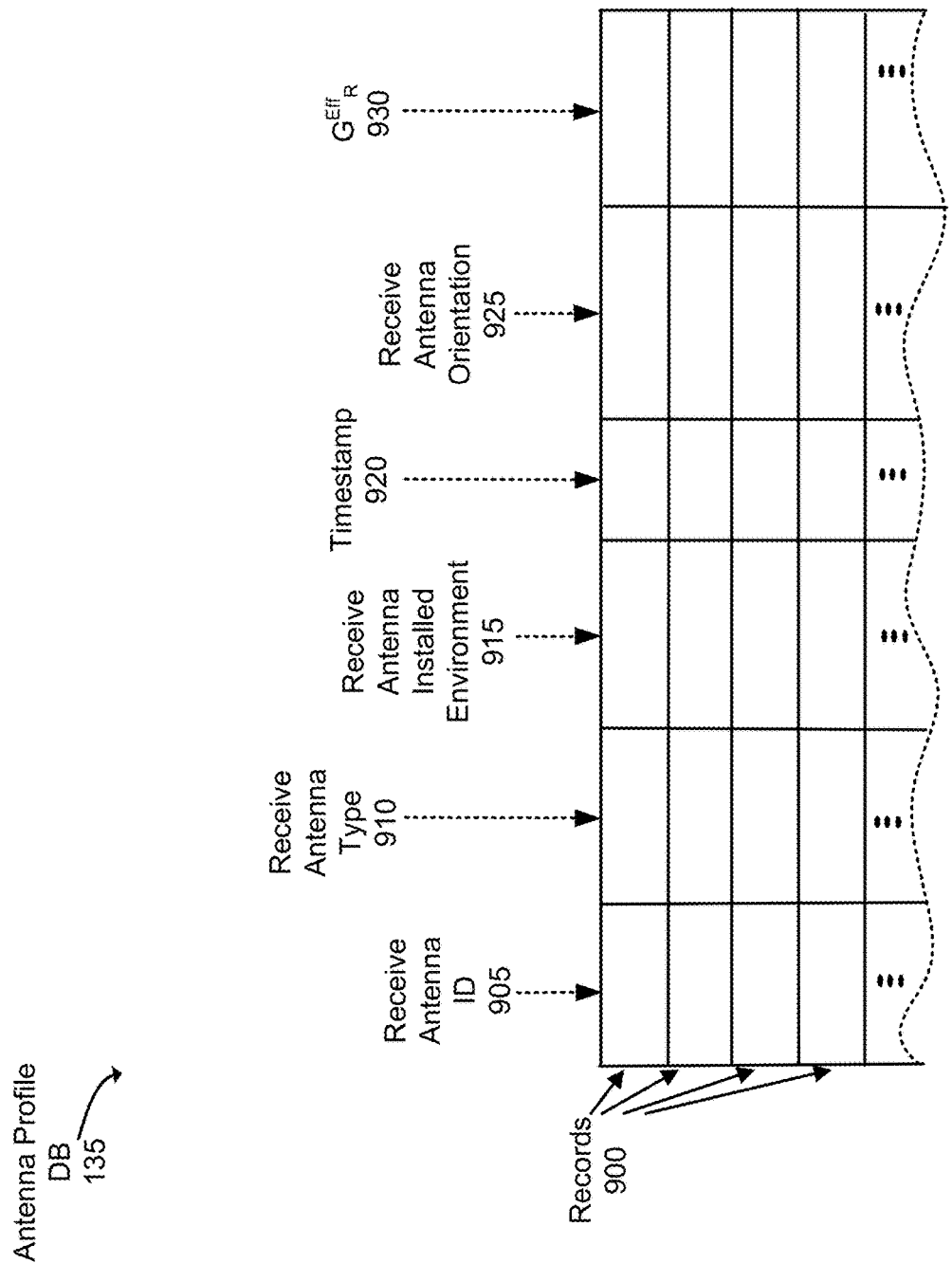
FIG. 9 depicts an exemplary implementation of a data structure that may be stored in the antenna profile database of FIG. 1.

FIG. 9 depicts an exemplary implementation of a data structure that may be stored in antenna profile DB 135. As shown, the stored data structure may include multiple records 900 associated with transmissions from transmit antennas 200-T of transmitters Tx 105 to receive antennas 200-R of receivers Rx 110. Each record 900 may be associated with a particular transmission from a transmit antenna 200-T to an identified receive antenna 200-R across space in an installed environment. Each record 900 may include a receive antenna identifier (ID) field 905, a receive antenna type field 910, a receive antenna installed environment field 915, a timestamp field 920, a receive antenna orientation field 925, and a receive antenna effective gain ($G^{Eff}_R$) field 930.

Receive antenna ID field 905 stores a unique identifier (ID) associated with a particular receive antenna 200-R of a receiver Rx 110 that received a transmission. Receive antenna type field 910 stores data identifying a particular type of antenna of the antenna identified in field 905 of the record 900. Receive antenna installed environment field 915 stores data that identifies a particular environment at which the receive antenna, identified in field 905, is installed. The particular environment identified in field 915 may include, for example, an identifier associated with a vehicle (and possibly a location upon the vehicle) upon which the antenna is installed. Other types of installed environments may be identified in field 915. Timestamp field 920 stores a time (e.g., date, and time in Hours: Minutes: Seconds: Milliseconds format) at which the transmission was received by the receive antenna identified in field 905. Receive antenna orientation field 925 stores data indicating a heading, elevation, and/or azimuth of the antenna identified in field 905 at the time, identified in timestamp field 920, at which the particular transmission was received from a transmit antenna. $G^{Eff}_R$ field 930 stores a determined value for an effective directional antenna gain $G^{Eff}_R$ of the antenna identified in field 905. The value for the effective directional antenna gain specifies a gain of the antenna identified in field 905, of the antenna type identified in field 910, in the installed environment identified in field 915 at the antenna orientation identified in field 915. The value for the effective directional antenna gain $G^{Eff}_R$ may, in some implementations, be determined as described below with respect to FIGS. 10A and 10B.

To locate a particular record 800 or 900, the data structure of antenna measurement DB 125 or antenna profile DB 135 may be queried with particular data to locate a record 800 or 900 having matching data stored in a particular one of the fields 805-885 or 905-930. When such a record 800 or 900 is located, data may be stored in one or more fields of the record 800 or 900, or data may be retrieved from one or more fields of the record 800 or 900. For example, if a particular receive antenna ID is known, then the records 800 of antenna measurement DB 125 may be queried with the known antenna ID to locate one or more records having a matching antenna ID stored in field 810.

The data structures of antenna measurement DB 125 of FIG. 8, and antenna profile DB 135 of FIG. 9, are depicted as including tabular data structures with certain numbers of fields having certain content. The tabular data structures shown in FIGS. 8 and 9, however, are for illustrative purposes. Other types of data structures may alternatively be used. The number, types, and content of the entries and/or fields in the data structures illustrated in FIGS. 8 and 9 are also for illustrative purposes. Other data structures having different numbers of, types of and/or content of, the entries and/or the fields may be implemented. Therefore, the data structures depicted in FIGS. 8 and 9 may include additional, fewer and/or different entries and/or fields than those shown.

Figure 10A:
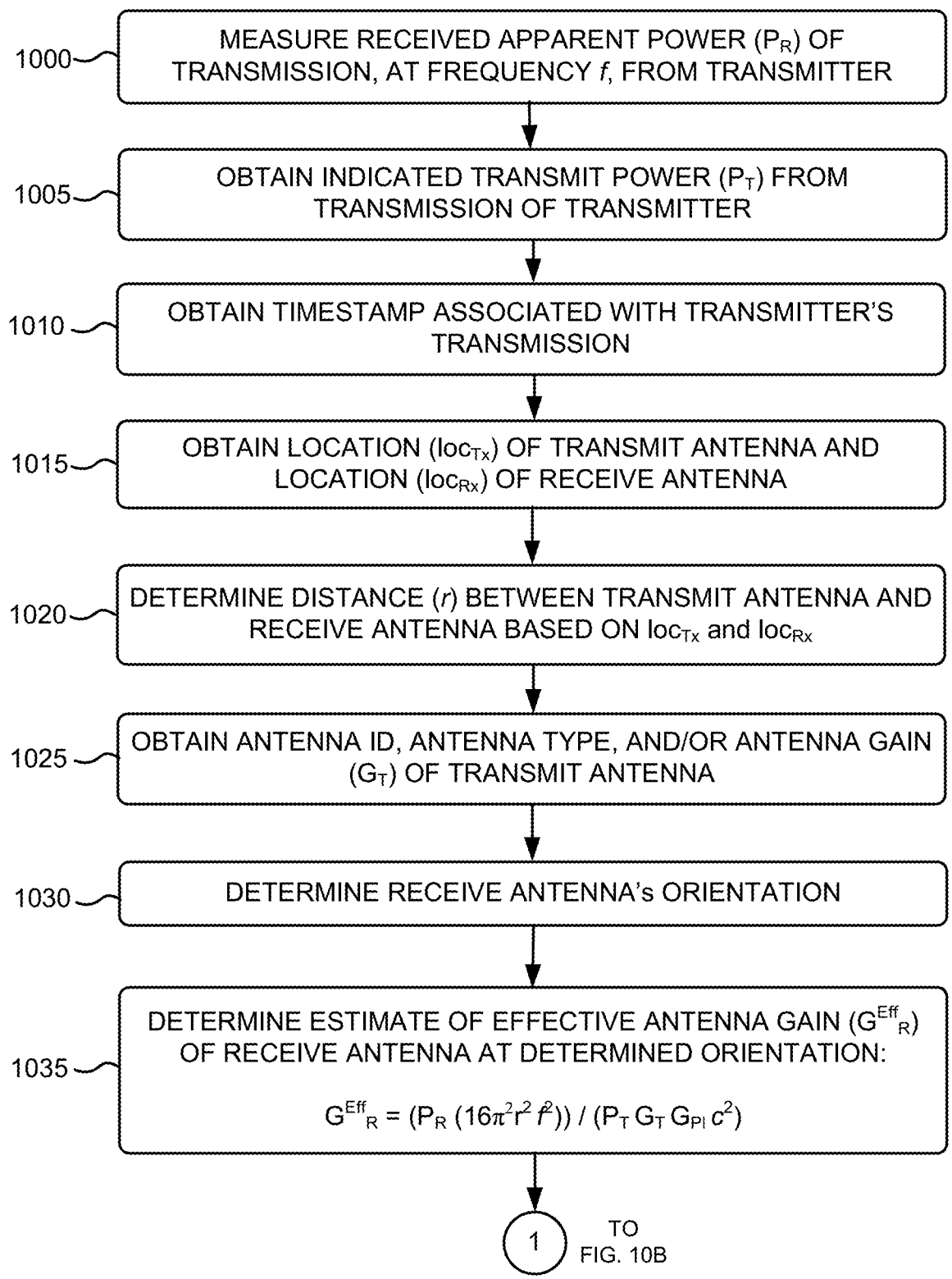
FIGS. 10A and 10B illustrate an exemplary process for determining an effective receive antenna gain during a training phase in an installed environment.
Figure 10B:
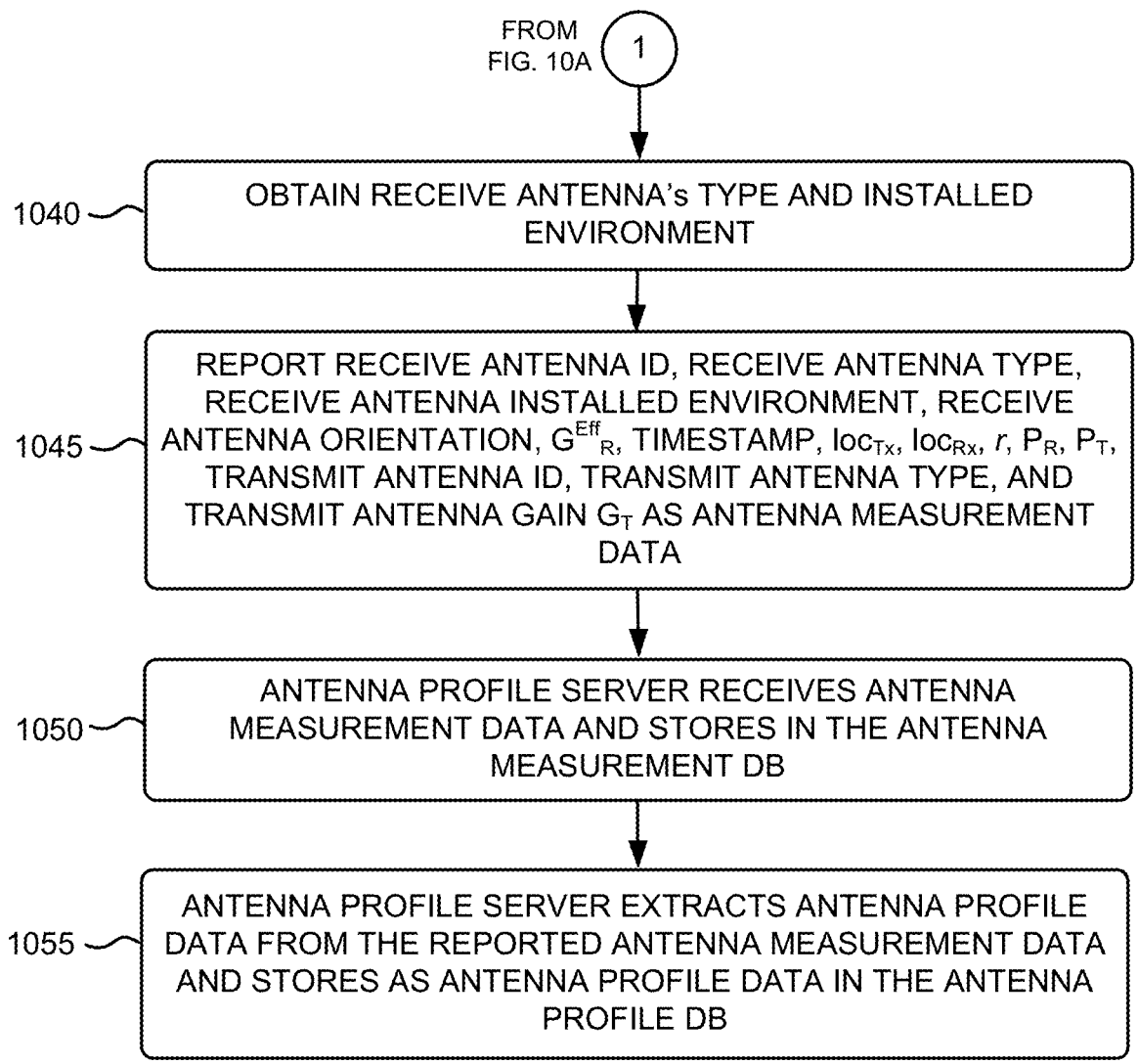

FIGS. 10A and 10B illustrate an exemplary process for determining an effective receive antenna gain during a training phase in an installed environment. The exemplary process of FIGS. 10A and 10B may, for example, be implemented by a receiver Rx 110.

The exemplary process includes Rx 110 measuring an apparent power $P_R$ of a transmission, at a frequency f, received from a transmitter Tx 105 (block 1000). Referring to FIG. 2, transmit antenna 200-T of transmitter Tx 105 may send a training transmission, at a frequency f, across a path through space to receive antenna 200-R of the Rx 110. The apparent receive power $P_R$ of the training transmission, upon receipt at receive antenna 200-R, may be measured by components of Rx 110.

Rx 110 obtains an indicated transmit power $P_T$ from a transmission of the Tx 105 (block 1005). The training transmission from Tx 105 may include an indication of the power $P_T$ of the transmission from the transmit antenna 200-T, and Rx 110 may extract the transmit power $P_T$ indication from the transmission.

Rx 110 obtains a timestamp associated with the transmitter's transmission (block 1010). In one implementation, the training transmission from Tx 105 may include a timestamp associated with the time that the training transmission is transmitted from the Tx 105. In another implementation, Rx 110 may locally obtain a timestamp associated with the time that the training transmission is received at Rx 110. The timestamp may include a date and a time in, for example, a Hours:Minutes:Seconds:Milliseconds format.

Rx 110 obtains a location $loc_{Tx}$ of the Tx 105's transmit antenna, and a location $loc_{Rx}$ of the Rx 110's receive antenna (block 1015). In one implementation, the training transmission from Tx 105 may include coordinates associated with the geographic location $loc_{Tx}$ of transmit antenna 200-T. In another implementation, Rx 110 may retrieve known coordinates of the geographic location $loc_{Tx}$ of transmit antenna 200-T from a central database. For example, the known coordinates of the geographic location of transmit antennas may be retrieved from storage in antenna profile DB 125. Rx 110 may further obtain the location $loc_{Rx}$ of the receive antenna 200-R from geo-location device 755.

Rx 110 determines a distance r between the transmit antenna and the receive antenna based on $loc_{Tx}$ and $loc_{Rx}$ (block 1020). The geographic locations $loc_{Tx}$ and $loc_{Rx}$ may be represented in, for example, latitude and longitude format. Rx 110 may use, for example, the Haversine formula to determine the distance r between the transmit antenna 200-T and the receive antenna 200-R based on the latitude and longitude of the transmit antenna 200-T and the latitude and longitude of the receive antenna 200-R.

Rx 110 obtains an antenna ID, antenna type, and/or antenna gain $G_T$ of the transmit antenna of Tx 105 (block 1025). In one implementation, the training transmission from Tx 105 may identify the antenna ID, antenna type, and antenna gain $G_T$ of the transmit antenna. In another implementation, the training transmission may identify the antenna ID, and Rx 110 may retrieve, using the antenna ID, the antenna type and the antenna gain $G_T$ of the transmit antenna from a central database such as, for example, from antenna profile DB 135. Alternatively, the training transmission may include data that indicates the Effective Isotropic Radiated Power (EIRP) of the transmit antenna 200-T of Tx 105. The Tx EIRP equals the transmit antenna power, in dBm, added to the Tx antenna Gain (i.e., accounting for internal losses) in dB:

$$Tx\ EIRP = Tx\ Power(dBm) + Tx\ antenna\ Gain(dB) \qquad \text{Eqn. (3)}$$

If the training transmission includes data that indicates the $EIRP_T$ of the transmit antenna, then the antenna gain $G_T$ of the transmit antenna would not need to be retrieved from the antenna profile DB 135.

Figure 10D:
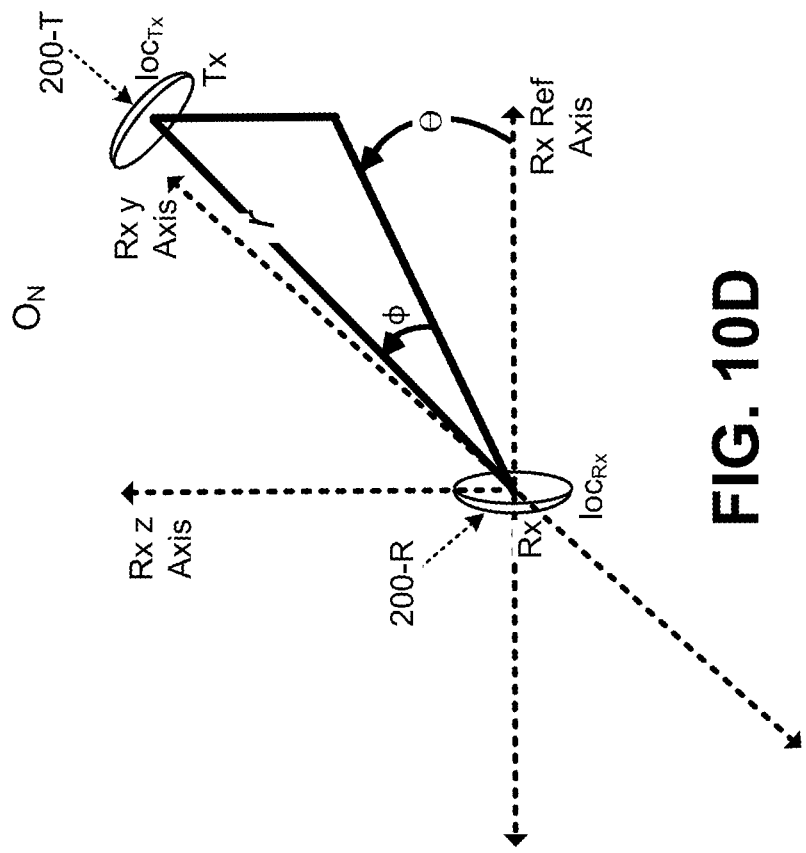
FIG. 10D illustrates a reference frame associated with the normalized orientation of a transmit antenna relative to a receive antenna, where the normalized orientation includes an azimuth angle θ and elevation angle φ.
Figure 10C:
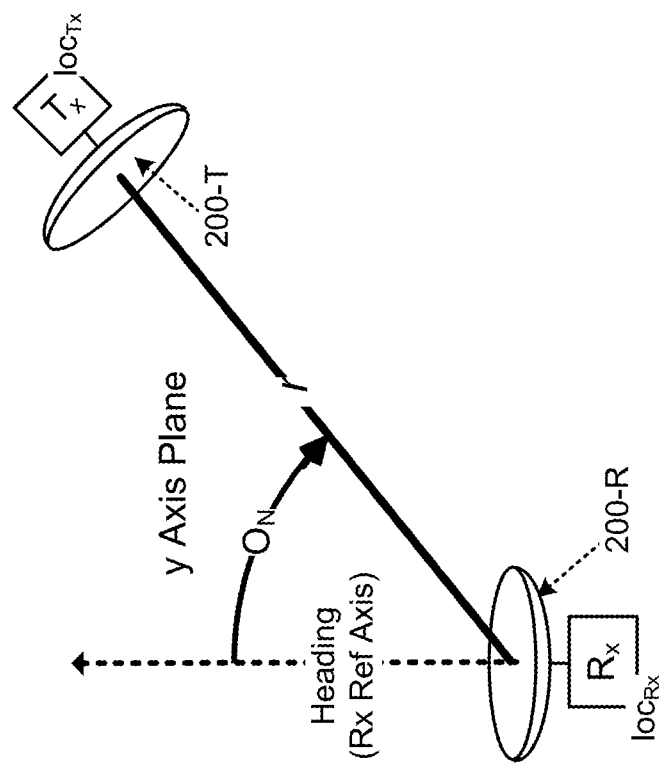
FIG. 10C illustrates a normalized orientation angle $O_N$ relative to the transmitter and the receiver reference axis.

Rx 110 determines the receive antenna's orientation (block 1030). The orientation of the receive antenna may include the direction that the antenna is pointing (i.e., its compass heading), the antenna's elevation, and the antenna's azimuth. Rx 110 may obtain the heading of the receive antenna from the heading sensor of orientation devices 745, and Rx 110 may determine the elevation and azimuth of the receive antenna based on the pitch and roll measured by the pitch sensor and the roll sensor of orientation devices 745. The determined receive antenna's orientation may be normalized to take into consideration the relative positions of the transmit antenna 200-T and the receive antenna 200-R and provide a normalized orientation relative to the transmit antenna 200-T that is aligned with the receive antenna reference axis. Referring to FIG. 10C, which depicts a simplified, planar view of the normalized orientation, the Rx reference axis of the receive antenna 200-R includes the heading associated with the receive antenna 200-R. When the transmit antenna 200-T is located at an angle (i.e., an azimuth angle and elevation angle) relative to the heading of the receive antenna, then a normalized orientation $O_N$, relative to the Rx reference axis, can be determined based on the locations $loc_{Rx}$ and $loc_{Tx}$ of the receiver and the transmitter and the distance r between the locations $loc_{Rx}$ and $loc_{Tx}$. Thus, as shown in FIGS. 10C and 10D, the orientation $O_N$ includes the azimuth and elevation angles between the Rx reference axis (i.e., the heading of the receive antenna) and the line connecting receive antenna 200-R and transmit antenna 200-T. FIG. 10D illustrates a three-dimensional reference frame associated with the normalized orientation of the transmit antenna 200-T relative to the receive antenna 200-R, where the normalized orientation includes an azimuth angle θ and elevation angle φ within the reference frame. As shown in FIG. 10D, transmit antenna 200-T, at location $loc_{Tx}$, has a normalized orientation $O_N$ relative to the location $loc_{Rx}$ of the receive antenna 200-R that includes an azimuth angle θ and elevation angle φ relative to the reference frame (Rx Ref (x) Axis, Rx y axis, and Rx z axis) of the receive antenna 200-R.

Rx 110 determines an effective antenna gain $G^{Eff}_R$ of the receive antenna at the determined antenna orientation using the following equation (block 1035):

$$G^{Eff}_R = (P_R(16\pi^2 r^2 f^2))/P_T G_T G_{P1} c^2 \qquad (4)$$

which includes Eqn. (2) solved for $G^{Eff}_R$, and with λ=f/c substituted into Eqn. (2), where c is equal to the speed of light. The effective antenna gain $G^{Eff}_R$ determined using Equation (4) represents an effective directional antenna gain at the orientation (e.g., heading, elevation, and azimuth) of the receive antenna determined in block 1030. A known value of the path loss gain $G_{P1}$ may be used in equation (3), or a value of the path loss gain $G_{P1}$ may be estimated. For example, in a particular environment having little or no path loss between the transmitter and receiver, $G_{P1}$ may be assumed to be a value of 1.0. Other values of $G_{P1}$, however, may alternatively be used depending on the particular environment between the transmitter and the receiver.

Rx 110 obtains the receive antenna 200-R's type and installed environment (block 1040). The antenna type assigned to the Rx 110's antenna 200-R may be stored locally, along with an indicator that identifies the installed environment at Rx 110. Receive antennas may include various different types of antennas, and each different type of antenna may be assigned a different antenna type identifier. The installed environment indicator may, for example, include a code that uniquely identifies the physical environment in which the antenna is installed.

Rx 110 reports the receive antenna ID, receive antenna type, receive antenna installed environment, receive antenna orientation, $G^{Eff}_R$, timestamp, $loc_{Tx}$, $loc_{Rx}$, distance r, $P_T$, $P_R$, transmit antenna ID, transmit antenna type, and $G_T$ to antenna profile server 115 as antenna measurement data (block 1045). Rx 110 generates a data unit (e.g., a packet), inserts the antenna measurement data into a payload of the data unit, and sends the data unit to antenna profile server 115 for storage in antenna measurement DB 125.

Antenna profile server 115 receives the reported antenna measurement data associated with the Rx 110's receive antenna 200-R and stores the antenna measurement data in a record 800 of antenna measurement DB 125 (block 1050). Antenna profile server 115 receives the data unit from Rx 110, extracts the payload data, identifies a record 800 in antenna measurement DB 125 in which the payload data is to be stored, and then stores the timestamp in field 805, the receive antenna ID in field 810, the receive antenna type in field 815, the receive antenna installed environment in field 820, the receive antenna orientation in field 825, the $G^{Eff}_R$ in field 830, the $P_R$ in field 840, the $loc_{Rx}$ in field 845, the transmit antenna ID in field 850, the transmit antenna type in field 855, the $loc_{Tx}$ in field 860, the $P_T$ in field 865, the $G_T$ in field 870, and the distance r in field 880 of antenna measurement DB 125.

Antenna profile server 115 extracts antenna profile data from the reported measurement data and stores the extracted data as antenna profile data in antenna profile DB 135 (block 1055). In one implementation, antenna profile server 115 may extract the receive antenna ID, the receive antenna type, the receive antenna installed environment, the timestamp, the receive antenna orientation, and the $G^{Eff}_R$ from the antenna measurement data and store in a record 900 of antenna profile DB 135. For example, antenna profile server 115 may store the receive antenna ID in field 905, the receive antenna type in field 910, the receive antenna installed environment in field 915, the timestamp in field 920, the receive antenna orientation in field 925, and the $G^{Eff}_R$ in field 930 in a particular record 900 of antenna profile DB 135. The antenna profile data stored in DB 135 may include a set of data that uniquely characterizes a particular antenna, of a particular antenna type within a particular installed environment, at a particular antenna orientation. The antenna profile data may subsequently be used, for example, for determining a geo-location of the antenna, such as described below with respect to the exemplary process of FIG. 11. The antenna profile data may, however, be used for applications other than antenna geo-location determination.

The exemplary process of FIGS. 10A and 10B may be repeated for each training transmission received at a receive antenna 200-R associated with a particular receiver Rx 110. For example, the exemplary process of FIGS. 10A and 10B may be repeated at each receiver Rx 110 of multiple receivers that receive a same test/training transmission from a same transmitter Tx 105.

Figure 11A:
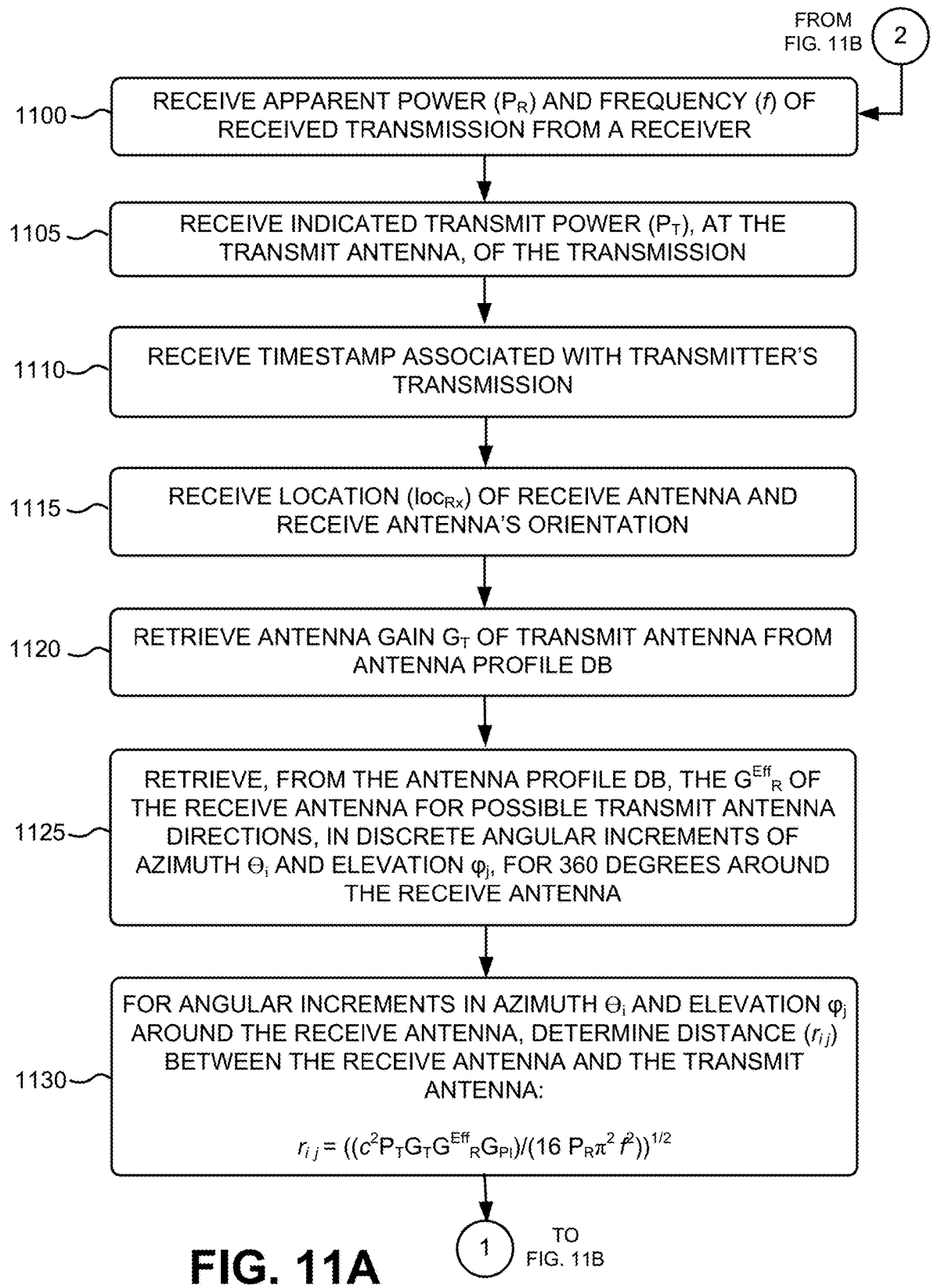
FIGS. 11A and 11B illustrate an exemplary process for estimating a location of a transmit antenna associated with a transmitter based on an apparent receive power $P_R$ of a transmission from the transmit antenna and using one or more antenna profiles stored in the antenna profile database of FIG. 1.
Figure 11B:
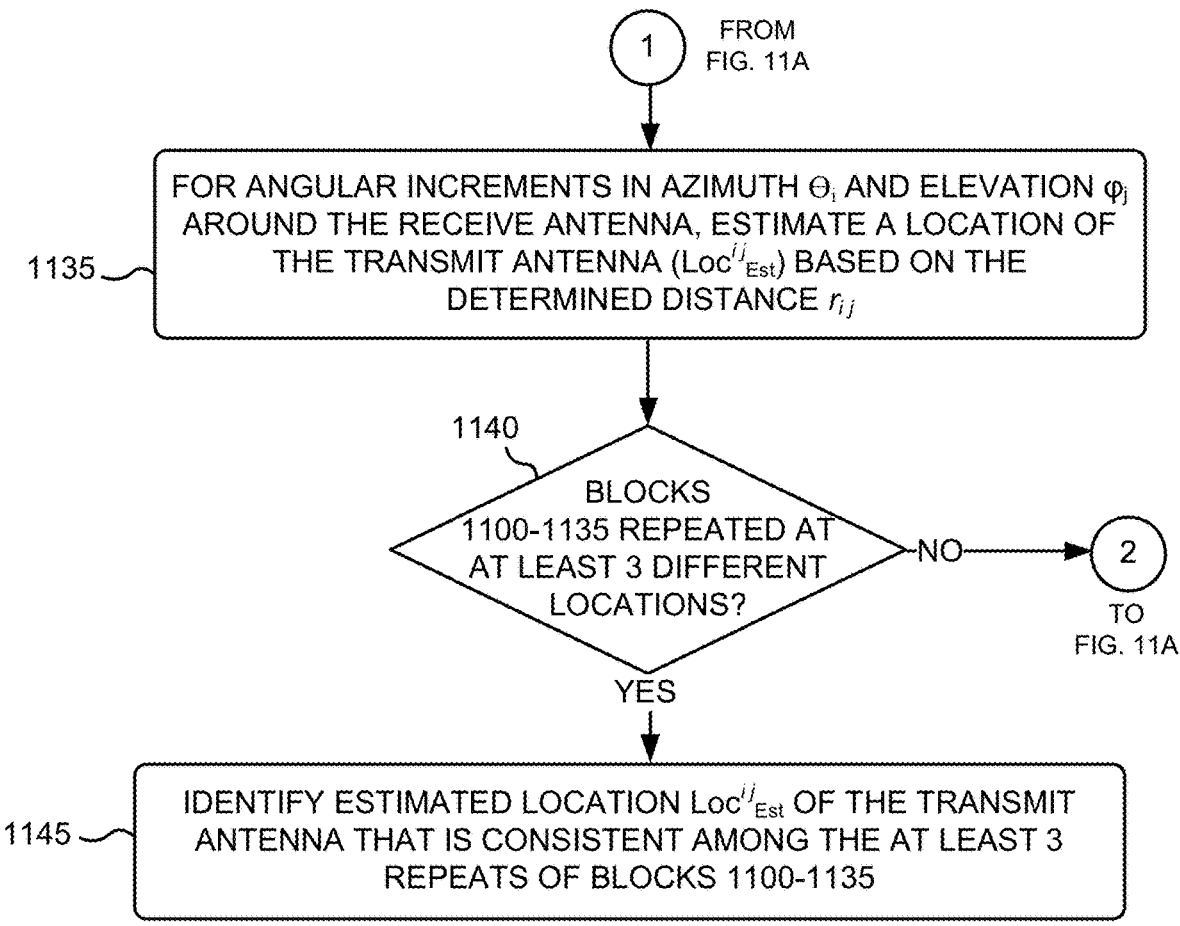

FIGS. 11A-11B illustrate an exemplary process for estimating a location of a transmit antenna 200-T associated with a transmitter Tx 105 based on multiple measurements of an apparent receive power $P_R$ of a transmission from the transmit antenna 200-T and using one or more antenna profiles stored in antenna profile DB 135. In one implementation, the exemplary process of FIGS. 11A-11B may be implemented by location estimator 120.

The exemplary process includes location estimator 120 receiving an apparent power $P_R$ and frequency f of a received transmission from a receiver Rx 110 (block 1100), receiving an indicated transmit power $P_T$ of the transmission, receiving a timestamp associated with the transmitter's transmission (block 1110), and receiving a location $loc_{Rx}$ of the receive antenna and the receive antenna's orientation (block 1115). A receiver Rx 110, having an associated receive antenna 200-R, may receive a transmission from a transmit antenna 200-T associated with a transmitter Tx 105. Rx 110 may measure an apparent receive power $P_R$ of the transmission. Rx 110 may additionally extract an indicated transmit power $P_T$ and a timestamp from the transmission. Rx 110 may further determine a current orientation (e.g., heading, elevation, and azimuth) of the receive antenna 200-R from sensors of orientation devices 745, and a location $loc_{Rx}$ of the receive antenna from geo-location device 755. Rx 110 may transmit one or more data units to location estimator 120 that includes the $P_R$, $P_T$, timestamp, current receive antenna orientation, and $loc_{Rx}$.

Figure 12A:
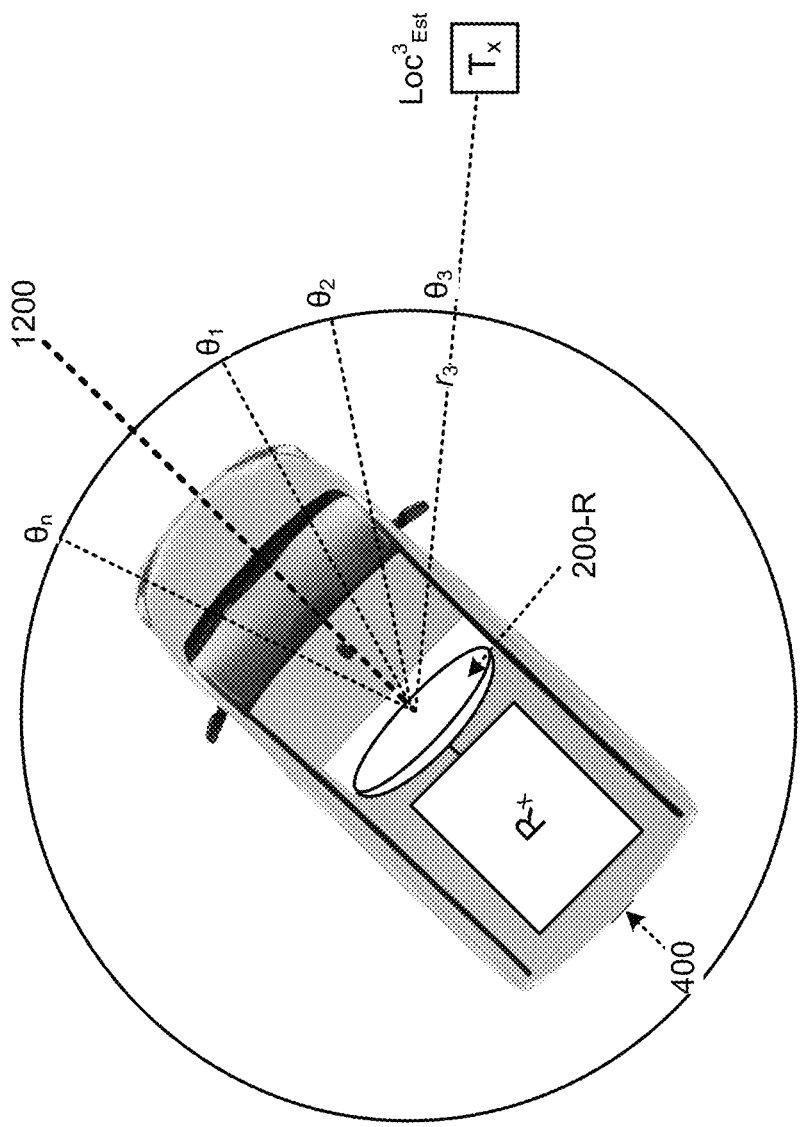
FIG. 12A depicts an example of angular increments θ1-θn in 360 degrees around a receive antenna in an installed environment.

Location estimator 120 retrieves an antenna gain $G_T$ of the transmit antenna 200-T from antenna profile DB 135 (block 1120), and retrieves, from antenna profile DB 135, the directional antenna gain $G^{Eff}_R$ of the receive antenna 200-R, for possible transmit antenna directions, in discrete angular increments of azimuth $\theta_i$ and elevation angle $\varphi_j$, for 360 degrees around the receive antenna 200-R (block 1125). Since the transmit antenna may be located at any location 360 degrees around the receive antenna 200-R (in both azimuth and elevation), location estimator 120 may identify and retrieve records 900 from antenna profile DB 135 having azimuths and elevations in receive antenna orientation field 925 that match the angular directional increments within 360 degrees around the receive antenna 200-R. For example, if 1 degree discrete angular increments are used, location estimator 120 may identify records 900 from antenna profile DB 135 having values in fields 905, 910, and 915 that match the receive antenna 200-R, and having azimuth and elevation values in orientation field 925 that match the 1 degree angular increments (1 degree, 2 degrees, 3 degrees, 4 degrees, and so on up to 360 degrees). Upon identification of the records 900, location estimator 120 retrieves the directional antenna gain $G^{Eff}_R$ stored in field 930 of each identified record 900. FIG. 12A depicts an example of angular increments $\theta_1$-$\theta_n$, relative to a reference axis 1200, in 360 degrees around a receive antenna 200-R having a vehicle 400 as an installed environment. Though not shown in FIG. 12A, the transmit antenna may also be located at any elevation 360 degrees around the receive antenna 200-R. Therefore, location estimator 120 may also identify and retrieve records 900 from antenna profile DB 135 having elevations in receive antenna orientation field 925 that match angular elevation increments within 360 degrees around the receive antenna 200-R. For example, if 1 degree discrete elevation increments are used, location estimator 120 may identify records 900 from antenna profile DB 135 having values in fields 905, 910, and 915 that match the receive antenna 200-R, and having elevation values in orientation field 925 that match the 1 degree angular increments (1 degree, 2 degrees, 3 degrees, 4 degrees, and so on up to 360 degrees). Upon identification of the records 900, location estimator 120 retrieves the directional antenna gain $G^{Eff}_R$ stored in field 930 of each identified record 900.

For angular increments in azimuth $\theta_i$ and elevation $\varphi_j$, around the receive antenna 200-R, location estimator 120 determines a distance $r_{ij}$ between the receive antenna and the transmit antenna using the following equation (block 1130):

$$r_{ij} = ((c^2 P_T G_T G^{Eff}_R G_{P1})/(16 P_R \pi^2 f^2))^{1/2} \qquad \text{Eqn. (5)}$$

A known, or assumed, value of the path loss gain $G_{P1}$ may be used in equation (5), or a value of the path loss gain $G_{P1}$ may be estimated. For example, in a particular environment having little or no path loss between the transmitter and receiver, $G_{P1}$ may be assumed to be a value of 1.0. Other values of $G_{P1}$, however, may alternatively be used depending on the particular environment between the transmit antenna and the receive antenna.

Figure 12B:
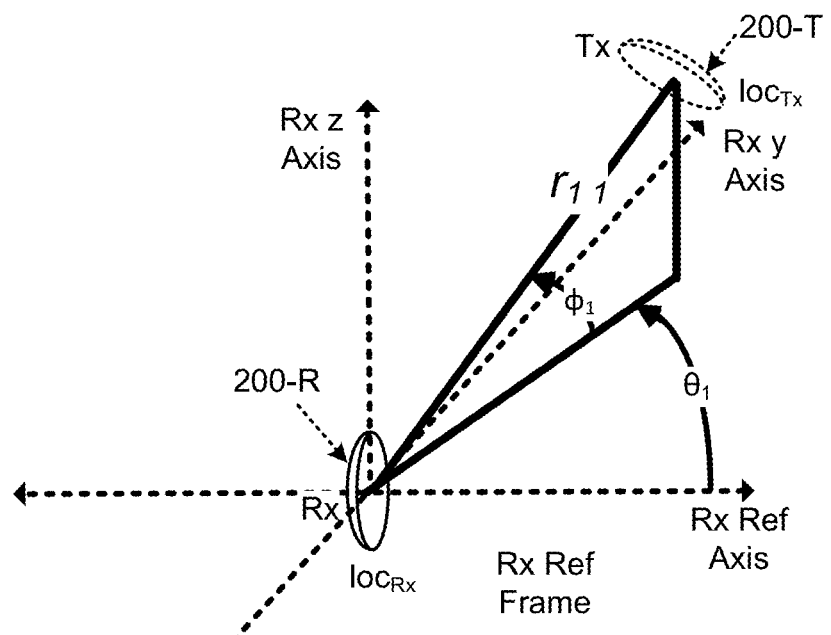
FIGS. 12B-12E depict examples of a receive antenna and a transmit antenna being at different distances r, azimuths θ, and elevations φ relative to one another.
Figure 12C:
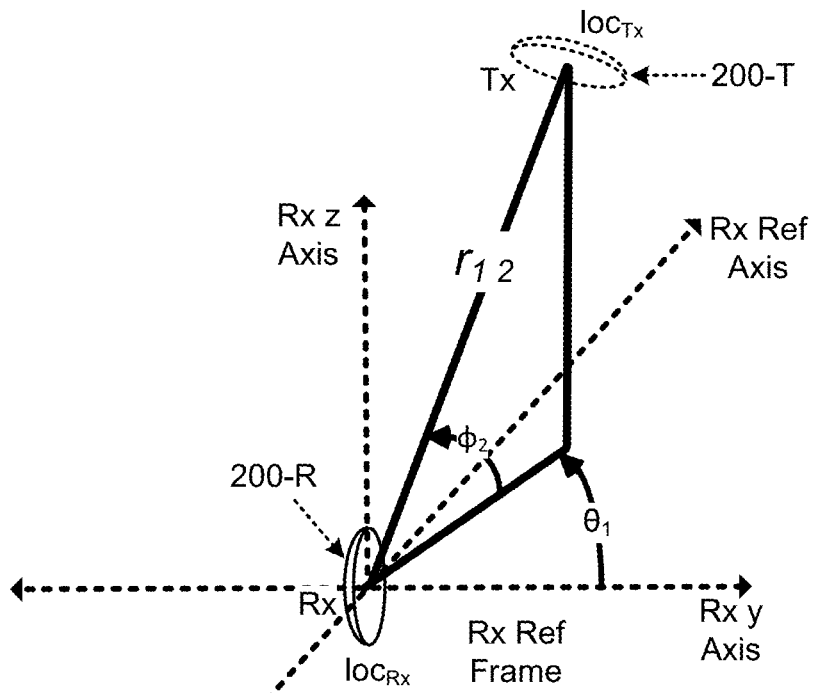
Figure 12D:
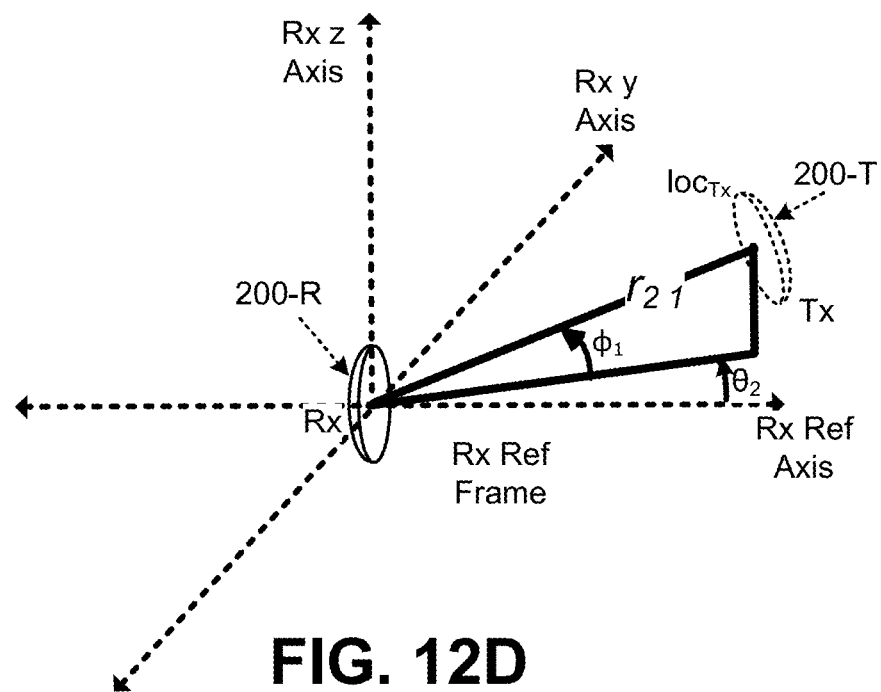
Figure 12E:
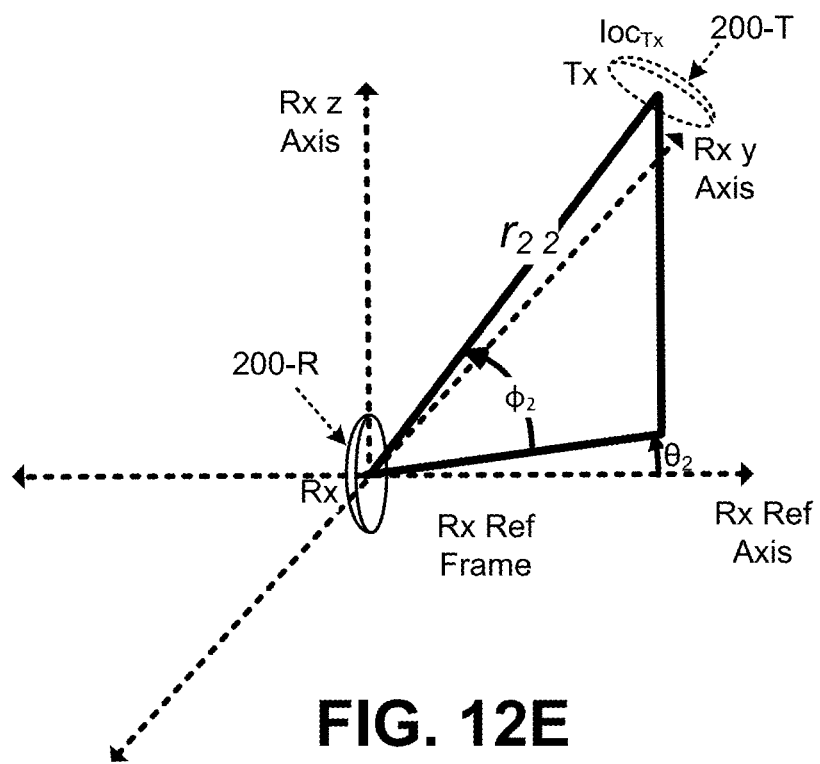

For angular increments in azimuth $\theta_i$ and elevation $\varphi_j$ around the receive antenna 200-R, location estimator 120 estimates a location of the transmit antenna ($Loc^{ij}_{Est}$) based on the determined distance $r_{ij}$ (block 1135). Location estimator 120 uses angular increments in azimuth $\theta_i$ and elevation $\varphi_j$ relative to the reference axis of the receive antenna 200-R, in conjunction with the determined distance $r_{ij}$ (determined in block 1130), to estimate the location of the transmit antenna $Loc^{ij}_{Est}$ in three-dimensional space relative to the receive antenna. FIGS. 12B-12E depict examples of the receive antenna 200-R and transmit antenna 200-T being at different distances r, azimuths $\theta$ and elevations $\varphi$ relative to one another. In the example of FIG. 12B, the transmit antenna 200-T resides at an azimuth $\theta_1$ and elevation $\varphi_1$ relative to the Rx reference frame, and the distance $r_{ij}$ between the location $loc_{Rx}$ of the receive antenna 200-R and the location $loc_{Tx}$ of the transmit antenna 200-T is determined as $r_{11}$. In the example of FIG. 12C, the transmit antenna 200-T resides at azimuth $\theta_1$ and elevation $\varphi_2$ (i.e., at a higher elevation as compared to FIG. 12B) relative to the Rx reference frame, and the distance $r_{ij}$ between the location $loc_{Rx}$ of the receive antenna 200-R and the location $loc_{Tx}$ of the transmit antenna 200-T is determined as $r_{12}$. In the example of FIG. 12D, the transmit antenna 200-T resides at an azimuth $\theta_2$ and elevation $\varphi_1$ relative to the Rx reference frame, and the distance $r_{ij}$ between the location $loc_{Rx}$ of the receive antenna 200-R and the location $loc_{Tx}$ of the transmit antenna 200-T is determined as $r_{21}$. In the example of FIG. 12E, the transmit antenna 200-T resides at an azimuth $\theta_2$ and elevation $\varphi_2$ relative to the Rx reference frame, and the distance $r_{ij}$ between the location $loc_{Rx}$ of the receive antenna 200-R and the location $loc_{Tx}$ of the transmit antenna 200-T is determined as $r_{22}$.

Location estimator 120 may repeat blocks 1100-1135 of FIGS. 11A-11B with the receive antenna 200-R located at at least three different locations. If blocks 1100-1135 have not been repeated at at least three different receive antenna locations (NO-block 1140), then the exemplary process returns to block 1100 with another transmission measurement at a different receive antenna location $loc_{Rx}$. If blocks 1100-1135 have been repeated at at least three different receive antenna locations (YES-block 1140), then location estimator 120 identifies the estimated location Loc$^{ij}_{Est}$ of the transmit antenna that is consistent among the at least three repeats of blocks 1100-1135 (block 1145). In other words, once blocks 1100-1135 have been repeated for at least three different locations loc$_{Rx}$ of the receive antenna 200-R, then the estimated location Loc$^{ij}_{Est}$ of the transmit antenna is identified among the results, from each repeat of blocks 1100-1135, that is the same location (or within a certain distance threshold of one another).

The exemplary process of FIGS. 11A and 11B may additionally be used in circumstances where the transmitter Tx 105 and the receiver Rx 110 are moving relative to one another. The repeated execution of the process of FIGS. 11A and 11B at short intervals enables a trajectory and speed of the Tx 105 and/or the Rx 110 to be determined.

Figure 13:
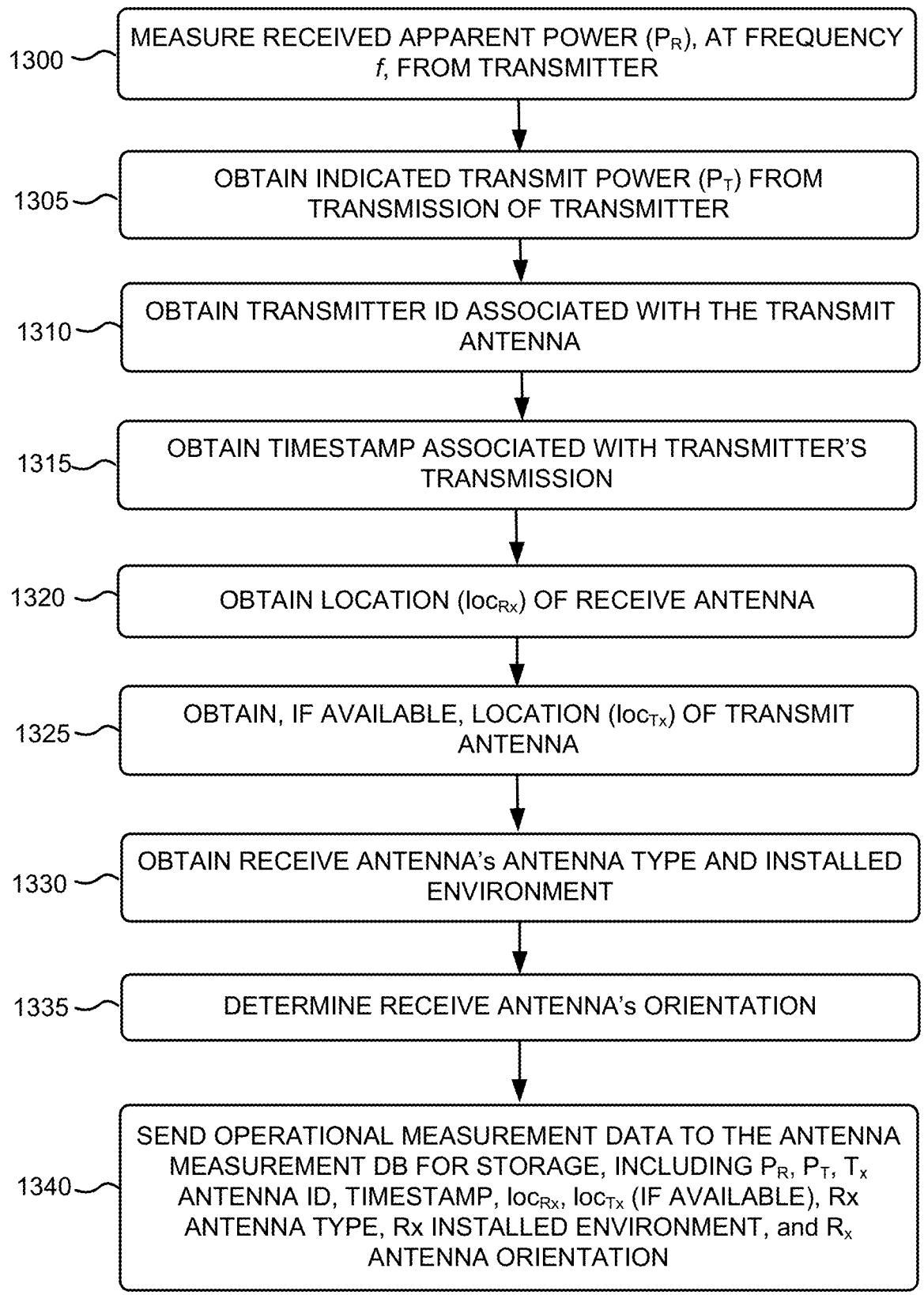
FIG. 13 illustrates an exemplary process for reporting, by a receiver, receive antenna operational measurement data for storage in the antenna measurement database of FIG. 1.

FIG. 13 illustrates an exemplary process for reporting, by a receiver Rx 110, receive antenna operational data for storage in antenna measurement DB 125. In one implementation, the exemplary process of FIG. 13 may be implemented by a receiver Rx 110 associated with a receive antenna 200-R.

The exemplary process includes a receiver Rx 110 measuring a received apparent power $P_R$, at a frequency f, of a transmission from a transmitter Tx 105 (block 1300). During normal operational transmissions between the transmitter Tx 105 and the receiver Rx 110, Rx 110 measures an apparent receive power $P_R$ of at least one of the transmissions.

Rx 110 obtains an indicated transmit power $P_T$ from the transmission of Tx 105 (block 1305) and obtains a transmitter ID associated with the transmit antenna 200-T (block 1310). At least one of the transmissions from the transmitter Tx 105 should include an indication of the transmit power $P_T$ of the transmission from the transmit antenna 200-T, and an identifier associated with the transmit antenna 200-T. Rx 110 extracts the transmit power $P_T$ indication and the identifier from the at least one transmission from Tx 105.

Rx 110 obtains a timestamp associated with the Tx 105's transmission (block 1315), obtains a location loc$_{Rx}$ of the receive antenna 200-R (block 1320), and obtains, if available, a location loc$_{Tx}$ of the transmit antenna 200-T (block 1325). In one implementation, a transmission from the transmitter Tx 105 may include a timestamp associated with a time at which the transmission was made. In another implementation, Rx 110 may locally obtain a timestamp associated with a time at which the transmission is received at Rx 110. In some implementations, the transmission from the Tx 105 may further include data indicating a location loc$_{Tx}$ of the transmit antenna. In other implementations, however, the transmission(s) from the Tx 105 may not include any transmitter/transmit antenna location data. Rx 110 may obtain the location loc$_{Rx}$ of the receive antenna 200-R from geo-location device 755.

Rx 110 obtains the receive antenna's antenna type and installed environment (block 1330). Rx 110 may store, locally, unique identifiers associated with the type of the receive antenna 200-R, and with the environment in which the receive antenna 200-R is installed. Rx 110 may retrieve the locally stored antenna type identifier and the antenna installed environment identifier from local memory. Rx 110 determines the receive antenna's orientation (block 1235). Rx 110 determines the receive antenna's orientation (e.g., elevation and azimuth) based on sensor data (e.g., heading, pitch, and roll sensor data) obtained from the sensors of orientation devices 745.

Rx 110 sends the antenna operational data to antenna measurement DB 125 for storage, including $P_R$, $P_T$, the Tx antenna ID, timestamp, loc$_{Rx}$, loc$_{Tx}$ (if available), Rx antenna type, Rx installed environment, and Rx antenna orientation (block 1340). Rx 110 generates a data unit, and inserts the $P_R$, $P_T$, the Tx antenna ID, timestamp, loc$_{Rx}$, loc$_{Tx}$ (if available), Rx antenna type, Rx installed environment, and Rx antenna orientation data into the data unit payload. Rx 110 stores the receive antenna operational data in a record 800 of antenna measurement DB 125. Rx 110 may send the data unit to antenna measurement DB 125, where the payload data is extracted, and a record 800 is identified into which the payload data is to be stored. The extracted $P_R$ is stored in field 840, $P_T$ is stored in field 865, the Tx antenna ID is stored in field 850, the timestamp is stored in field 805, the location loc$_{Rx}$ is stored in field 845, the Rx antenna type is stored in field 815, the Rx antenna installed environment is stored in field 820, and the Rx antenna orientation data is stored in field 825. The receive antenna's ID is additionally stored in field 810, and the transmit antenna's ID is stored in field 850 of the record 800. During the operational measurement process of FIG. 13, partial information associated with a transmission from a transmit antenna to a receive antenna may be captured in certain circumstances such that the Tx 110 reports fewer items of measurement data than described above with respect to block 1340. The partial information may be merged with other measurements over time to obtain sufficient measurement data for an antenna in a particular installed environment to generate accurate estimates of, for example, transmit antenna location or receive antenna effective directional gain $G^{Eff}R$.

Figure 14:
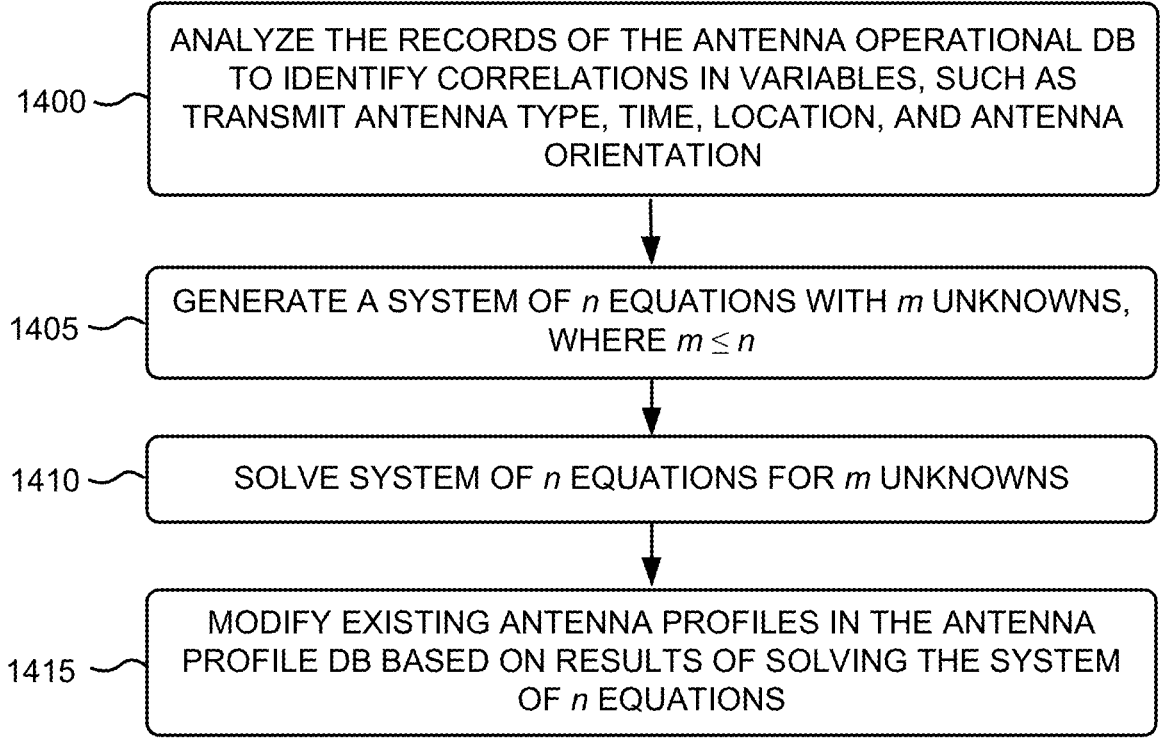
FIG. 14 illustrates an exemplary process for the automated updating of antenna profiles using current aggregated antenna measurement data stored in the antenna measurement database of FIG. 1.

FIG. 14 illustrates an exemplary process for the automated updating of antenna profiles using current aggregated antenna measurement data stored in antenna measurement DB 125. The exemplary process of FIG. 14 may be implemented by antenna profile server 115.

The exemplary process includes antenna profile server 115 analyzing the records of antenna measurement DB 125 to identify correlations in variables, such as correlations in transmit antenna type, time, location, and antenna orientation, between records of DB 125 (block 1400). In an operational environment, there may be many unknowns among the variables associated with transmissions between transmitters 105 and receivers 110, and with the characteristics of the transmitters 105 and receivers 110 themselves. The variables associated with transmissions may include multiple ones of the following variables: a timestamp, the transmit power $P_T$, the receive power $P_R$, the receive antenna type, the receive antenna installed environment, the effective receive antenna gain $G^{Eff}_R$ at a given receive antenna orientation, the transmit antenna type, the distance r between the transmit antenna and the receive antenna, the transmit antenna gain $G_T$, the path loss $G_{P1}$, the transmit antenna location loc$_{Tx}$, and/or the receive antenna location loc$_{Rx}$. In such an operational environment, where multiple variables associated with a particular transmission between a transmitter 105 and a receiver 110 may not be known, it may be impossible to solve for a given variable of interest from a single transmission measurement. Therefore, one or more variables may be solved, in instances where those variables can be solved, and knowledge of that solved variable may be used to solve for other unknown variables. As described further below, a system of n equations, derived from multiple transmissions between transmitters 105 and receivers 110 in an operational environment, may be used to solve for m unknowns, where m≤n.

To identify correlations in data across multiple transmissions between transmitters 105 and receivers 110, antenna profile server 115 may retrieve data from selected fields of records 800 of antenna measurement DB 125 and then identify correlations in the data. In one example, antenna profile server 115 may retrieve data from fields 810, 815, 805, 850, and 845 from multiple records and compare the retrieved data. If two or more records 800 have the following: 1) locations in fields 845 that are approximately the same (e.g., with x meters of one another), 2) a same antenna type stored in fields 810, 3) a same transmit antenna ID stored in fields 855, and 4) approximately the same timestamp stored in fields 805 (e.g., within x minutes of one another); then the installed environment, including the Tx location and the path loss $G_{P1}$, can be assumed to be approximately the same for each of the different receive antennas. Therefore, the receive antenna gain $G^{Eff}_R$, at a given receive antenna orientation, may be estimated to be approximately the same for each of the identified different receive antennas. Knowledge of $G^{Eff}_R$ for one of the identified receive antennas may, thus, enable the $G^{Eff}_R$ for the other identified antennas to be estimated as being the same.

Antenna profile server 115 generates a system of n equations with m unknowns, where m≤n (block 1405), and solves the system of n equations for the m unknowns (block 1410). From the analyzed records of block 1400, a system of n equations may be created, based on Equation (2) above, having m unknowns, and the system of n equations may be solved, in conjunction with one another, to cancel out one or more of the m unknowns to enable the solving for other of the m unknowns. Existing solvers that solve systems of multiple linear equations may, for example, be used to solve the system of n equations for the m unknowns.

Antenna profile server 115 modifies existing antenna profiles in antenna profile DB 135 based on results of solving the system of n equations (block 1415). For example, if a receive antenna gain $G^{Eff}_R$ for a particular antenna is solved in block 1410, and the solved antenna gain $G^{Eff}_R$ is different than a previously determined $G^{Eff}_R$ value stored for that antenna in a field 930 of a record 900 of antenna profile DB 135, then the previously stored $G^{Eff}_R$ value (e.g., determined during the training phase of FIGS. 10A and 10B) may be replaced with the newly solved $G^{Eff}_R$ value. Alternatively, the previously stored $G^{Eff}_R$ value may be averaged with the newly solved $G^{Eff}_R$ value to generate a new $G^{Eff}_R$ value. The newly generated $G^{Eff}_R$ value may be stored in the field 930 of the record 900 for the particular antenna.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
 receiving, at a network device, first data associated with a first transmission received at a second antenna from a first antenna;
 storing the first data as a first antenna profile associated with the second antenna; and
 using, by the network device, the stored first antenna profile for determining at least one first transmission characteristic associated with a third antenna transmitting to the second antenna.

2. The method of claim 1, wherein the first data includes characteristics of the first transmission, characteristics of the first antenna, and characteristics of the second antenna.

3. The method of claim 1, further comprising:
 estimating a location of the third antenna based on the first antenna profile.

4. The method of claim 1, further comprising:
 receiving, at the network device, second data associated with a plurality of transmissions received at a plurality of antennas from other antennas;
 storing the second data as second antenna profiles associated with the plurality of antennas; and
 using, by the network device, the stored second antenna profiles for determining at least one second transmission characteristic associated with a fourth antenna transmitting to one of the plurality of antennas.

5. The method of claim 4, wherein the second data includes characteristics of the plurality of transmissions, characteristics of the other antennas, and characteristics of the plurality of antennas.

6. The method of claim 1, wherein the at least one first transmission characteristic comprises a first distance between the third antenna and the second antenna, and wherein the determining the at least one first transmission characteristic comprises:
 determining the first distance based on the first antenna profile.

7. The method of claim 4, wherein the at least one second transmission characteristic comprises a second distance between the fourth antenna and the one of the plurality of antennas, and wherein the determining the at least one second transmission characteristic comprises:
 determining the second distance based on the second antenna profiles.

8. The method of claim 2, wherein the characteristics of the first transmission comprise a transmit power associated with the first transmission and an apparent receive power of the first transmission at the second antenna, wherein the characteristics of the first antenna comprise a location of the first antenna and an antenna gain of the first antenna, and wherein the characteristics of the second antenna comprise a location of the second antenna, an orientation of the second antenna relative to the first antenna, an installed environment of the second antenna, and an effective antenna gain of the second antenna.

9. The method of claim 5, wherein the characteristics of the plurality of transmissions comprise transmit powers associated with each of the plurality of transmissions and an apparent receive power of each of the plurality of transmissions at the plurality of antennas, wherein the characteristics of the other antennas comprise locations of the other antennas and antenna gains of the other antennas, and wherein the characteristics of the plurality of antennas comprise a location of each of the plurality of antennas, an orientation of the plurality of antennas relative to the other antennas, an installed environment of each of the plurality of antennas and an effective antenna gain of each of the plurality of antennas.

10. One or more network devices, comprising:
a communication interface configured to:
receive first data associated with a first transmission received at a second antenna from a first antenna; and
at least one processing unit configured to:
store, in a database, the first data as a first antenna profile associated with the second antenna; and
use the stored first antenna profile for determining at least one first transmission characteristic associated with a third antenna transmitting to the second antenna.

11. The one or more network devices of claim 10, wherein the at least one processing unit is further configured to:
estimating location of the third antenna based on the first antenna profile.

12. The one or more network devices of claim 10, wherein the communication interface is further configured to:
receive second data associated with a plurality of transmissions received at a plurality of antennas from other antennas, and
wherein the processing unit is further configured to:
store, in the database, the second data as second antenna profiles associated with the plurality of antennas, and
use the stored second antenna profiles for determining at least one second transmission characteristic associated with a fourth antenna transmitting to one of the plurality of antennas.

13. The one or more network devices of claim 10, wherein the first data includes characteristics of the first transmission, characteristics of the first antenna, and characteristics of the second antenna.

14. The one or more network devices of claim 10, wherein the at least one first transmission characteristic comprises a first distance between the third antenna and the second antenna, and wherein the at least one processing unit, when determining the at least one first transmission characteristic, is further configured to:
determine the first distance based on the first antenna profile.

15. The one or more network devices of claim 12, wherein the at least one second transmission characteristic comprises a second distance between the fourth antenna and the one of the plurality of antennas, and wherein, when the determining the at least one second transmission characteristic, the at least one processing unit is further configured to:
determine the second distance based on the second antenna profiles.

16. The one or more network devices of claim 13, wherein the characteristics of the first transmission comprise a transmit power associated with the first transmission and an apparent receive power of the first transmission at the second antenna, wherein the characteristics of the first antenna comprise a location of the first antenna and an antenna gain of the first antenna, and wherein the characteristics of the second antenna comprise a location of the second antenna, an orientation of the second antenna relative to the first antenna, an installed environment of the second antenna, and an effective antenna gain of the second antenna.

17. The one or more network devices of claim 13, wherein the characteristics of the plurality of second transmissions comprise transmit powers associated with each of the plurality of transmissions and an apparent receive power of each of the plurality of transmissions at the plurality of antennas, wherein the characteristics of the other antennas comprise locations of the other antennas and antenna gains of the other antennas, and wherein the characteristics of the plurality of antennas comprise a location of each of the plurality of antennas, an orientation of the plurality of antennas relative to the other antennas, an installed environment of each of the plurality of antennas and an effective antenna gain of each of the plurality of antennas.

18. A non-transitory storage medium storing instructions executable by a network device, wherein the instructions comprise instructions to cause the network device to:
receive first data associated with a first transmission received at a second antenna from a first antenna, wherein the first data includes characteristics of the first transmission, characteristics of the first antenna, and characteristics of the second antenna;
store, in a database, the first data as a first antenna profile associated with the second antenna; and
use the stored first antenna profile for determining at least one first transmission characteristic associated with a third antenna transmitting to the second antenna.

19. The non-transitory storage medium of claim 18, wherein the instructions further comprise instructions to cause the network device to:
receive second data associated with characteristics of a plurality of transmissions received at a plurality of antennas from other antennas, wherein the second data includes characteristics of the plurality of transmissions, characteristics of the other antennas, and characteristics of the plurality of antennas;
store, in the database, the second data as a second antenna profile associated with the fourth antenna; and
use the stored second antenna profile for determining at least one second transmission characteristic associated with a fourth antenna transmitting to the second antenna.

20. The non-transitory storage medium of claim 18, wherein the at least one first transmission characteristic comprises a first distance between the third antenna and the second antenna, and wherein the determining the at least one first transmission characteristic comprises:

determining the first distance based on the first antenna profile.

\* \* \* \* \*